(12) United States Patent
Abesingha et al.

(10) Patent No.: US 11,811,304 B2
(45) Date of Patent: Nov. 7, 2023

(54) POWER CONVERTERS, POWER SYSTEMS, AND METHODS FOR PROTECTING POWER CONVERTERS

(71) Applicant: pSemi Corporation, San Diego, CA (US)

(72) Inventors: Buddhika Abesingha, Escondido, CA (US); Gregory Szczeszynski, Nashua, NH (US)

(73) Assignee: pSemi Corporation, San Diego, CA (US)

( * ) Notice: Subject to any disclaimer, the term of this patent is extended or adjusted under 35 U.S.C. 154(b) by 167 days.

(21) Appl. No.: 17/455,671

(22) Filed: Nov. 19, 2021

(65) Prior Publication Data
US 2023/0163676 A1    May 25, 2023

(51) Int. Cl.
*H02M 1/32* (2007.01)
*H02M 3/158* (2006.01)
*H02M 1/00* (2006.01)
*H02M 3/07* (2006.01)

(52) U.S. Cl.
CPC ........... *H02M 1/32* (2013.01); *H02M 1/0009* (2021.05); *H02M 1/0095* (2021.05); *H02M 3/158* (2013.01); *H02M 3/07* (2013.01)

(58) Field of Classification Search
CPC .... H02M 1/32; H02M 1/0009; H02M 1/0095; H02M 3/158
See application file for complete search history.

(56) References Cited

U.S. PATENT DOCUMENTS

| | | | |
|---|---|---|---|
| 8,619,445 B1 * | 12/2013 | Low | H02M 3/073 363/59 |
| 10,686,367 B1 | 6/2020 | Low | |
| 10,958,166 B1 | 3/2021 | Low et al. | |
| 2016/0050729 A1 * | 2/2016 | Zhang | H05B 45/3725 315/246 |

* cited by examiner

*Primary Examiner* — Adolf D Berhane
*Assistant Examiner* — Afework S Demisse
(74) *Attorney, Agent, or Firm* — Finnegan, Henderson, Farabow, Garrett & Dunner LLP

(57) ABSTRACT

Disclosed embodiments may include a power converter having a power conversion circuit and a protection circuit. The power conversion circuit is electrically coupled between a first terminal and a second terminal, to convert a first voltage from the first terminal to a second voltage outputted at the second terminal. The protection circuit is electrically coupled between an input terminal of the power converter and the first terminal. The protection circuit includes a first protection device and a clamping circuit. The first protection device withstands an input voltage of the power converter to continue an operation of the power conversion circuit when the input voltage exceeds a voltage threshold value. The clamping circuit is electrically coupled to a control terminal of the first protection device to clamp a control voltage of the first protection device.

21 Claims, 14 Drawing Sheets

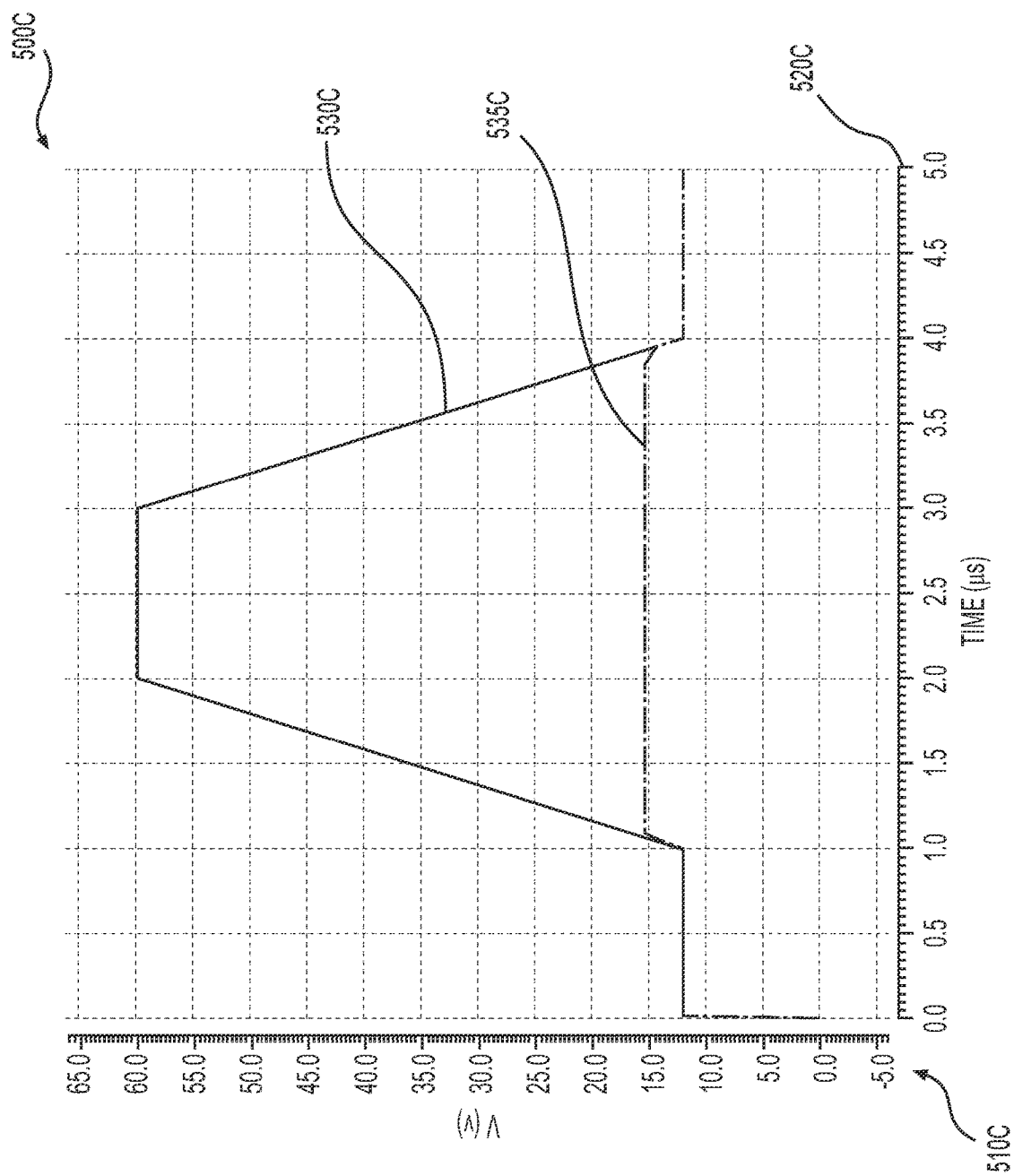

POWER CONVERTERS, POWER SYSTEMS, AND METHODS FOR PROTECTING POWER CONVERTERS

TECHNICAL FIELD

The present disclosure generally relates to power electronic devices. More particularly, the present disclosure relates to DC-DC power converters.

BACKGROUND

Many electronic products, particularly mobile computing and/or communication products and components (e.g., notebook computers, ultra-book computers, tablet devices, LCD and LED displays), require multiple voltage levels. For example, radio frequency transmitter power amplifiers may require relatively high voltages (e.g., 12V or more), and logic circuitry may require a low voltage level (e.g., 1-2V). Some other circuitry may require an intermediate voltage level (e.g., 5-10V). Power converters are often used to generate a lower or higher voltage from a common power source, such as a battery, in order to meet the power requirements of different components in the electronic products.

SUMMARY

Embodiments of the present disclosure provide a power converter. The power converter includes a power conversion circuit and a protection circuit. The power conversion circuit is electrically coupled between a first terminal and a second terminal, to convert a first voltage from the first terminal to a second voltage outputted at the second terminal. The protection circuit is electrically coupled between an input terminal of the power converter and the first terminal. The protection circuit includes a first protection device and a clamping circuit. The first protection device withstands an input voltage of the power converter to continue an operation of the power conversion circuit when the input voltage exceeds a voltage threshold value. The clamping circuit is electrically coupled to a control terminal of the first protection device to clamp a control voltage of the first protection device.

Embodiments of the present disclosure provide a method for protecting a power converter that receives a first voltage from a first terminal and provides a second voltage on a second terminal. The method includes: converting, by a power conversion circuit, the first voltage to the second voltage; controlling a first protection device electrically coupled between an input terminal of the power converter and the power conversion circuit to withstand an input voltage of the power converter to continue an operation of the power conversion circuit when the input voltage exceeds a voltage threshold value; and clamping a control voltage of the first protection device by a clamping circuit electrically coupled to a control terminal of the first protection device.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

BRIEF DESCRIPTION OF THE DRAWINGS

Embodiments and various aspects of the present disclosure are illustrated in the following detailed description and the accompanying figures. It is noted that, in accordance with standard practice in the industry, various features are not drawn to scale. In fact, the dimensions of the various features may be arbitrarily increased or reduced for clarity of discussion.

FIG. 5C is a diagram illustrating an over-voltage at the input terminal of the power converter, and the protection circuit limiting this voltage to a compliant voltage at the input of the charge pump power converter in accordance with some embodiments of the present disclosure.

DETAILED DESCRIPTION

Figure 1:
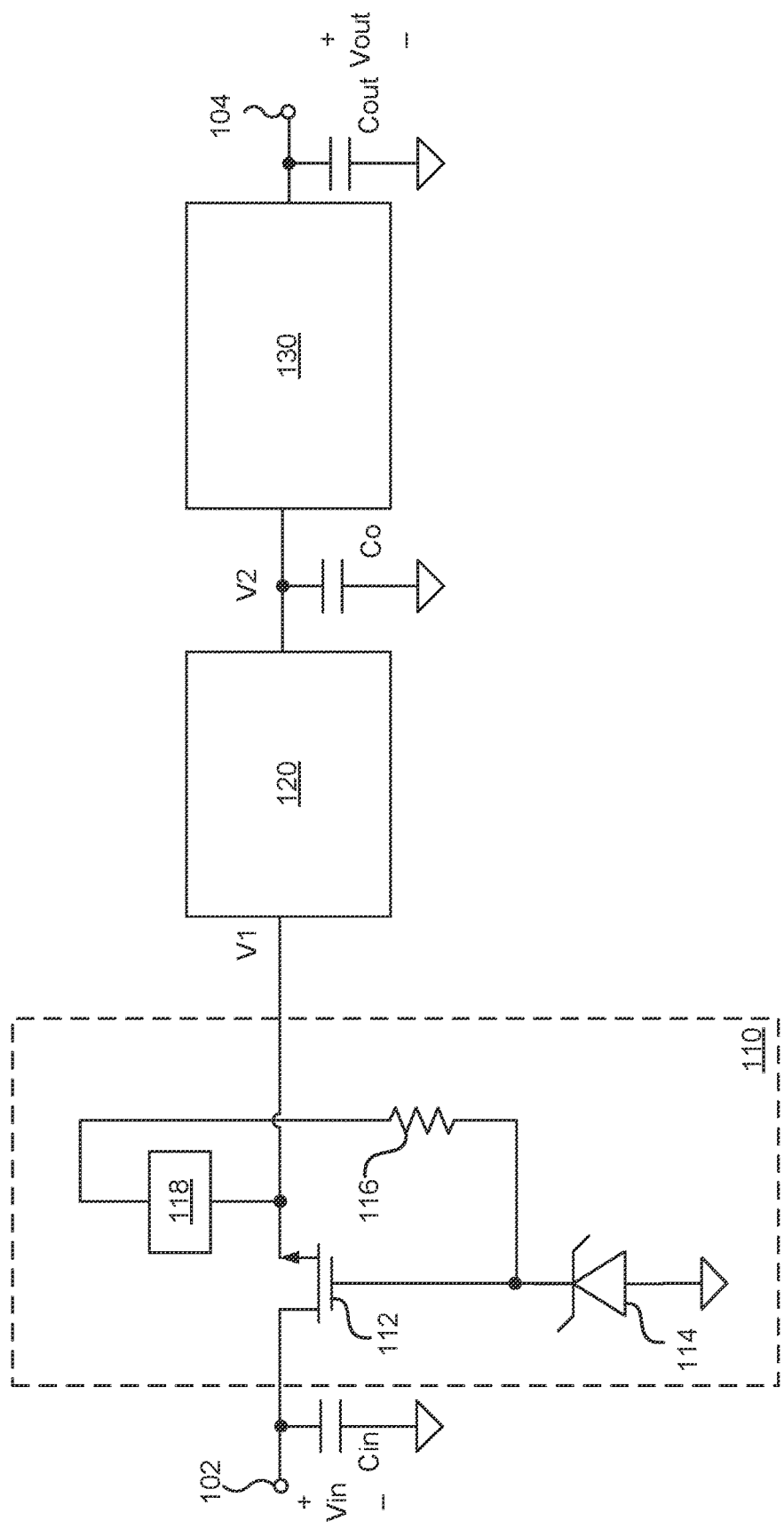
FIG. 1 is a diagram illustrating an exemplary power converter, in accordance with some embodiments of the present disclosure.

The following disclosure provides many different exemplary embodiments, or examples, for implementing different features of the provided subject matter. Specific simplified examples of components and arrangements are described below to explain the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this document, the term "coupled" may also be termed as "electrically coupled", and the term "connected" may be termed as "electrically connected". "Coupled" and "connected" may also be used to indicate that two or more elements cooperate or interact with each other.

Various embodiments of the present disclosure will be described with respect to embodiments in a specific context, namely a charge pump circuit. As used in this disclosure, the term "charge pump" refers to a switched-capacitor network configured to convert an input voltage to an output voltage. Examples of such charge pumps include cascade multiplier, Dickson, ladder, series-parallel, Fibonacci, and Doubler switched-capacitor networks, all of which may be configured as a multi-phase or a single-phase network.

The concepts in the disclosure may also apply, however, to other types of power converters. Power converters which convert a higher input voltage power source to a lower output voltage level are commonly known as step-down or buck converters, because the converter is "bucking" the input voltage. Power converters which convert a lower input voltage power source to a higher output voltage level are commonly known as step-up or boost converters, because the converter is "boosting" the input voltage. In addition, some power converters, commonly known as "buck-boost converters," may be configured to convert the input voltage power source to the output voltage with a wide range, in which the output voltage may be either higher than or lower than the input voltage. In various embodiments, a power converter may be bidirectional, being either a step-up or a step-down converter depending on how a power source is connected to the converter. In some embodiments, an AC-DC power converter can be built up from a DC-DC power converter by, for example, first rectifying an AC input voltage to a DC voltage and then applying the DC voltage to a DC-DC power converter.

Voltage ratings of electrical components, such as capacitors, inductors, and/or transistors, within the power converter may be selected according to actual needs. However, transient over-voltages may occur in the electric system due to the switching off of loads and due to short accelerator tip-ins, which may cause the electrical components to experience temporary over-voltage stress that results in damages to the power electronic devices. In some embodiments, a Metal-Oxide-Semiconductor Field-Effect Transistor (MOSFET) can be used as both the protection switch for preventing undesired power flow, and the voltage standoff device for withstanding a large voltage during the transient over-voltage condition and maintain normal operation of the power converter without triggering an isolation protection.

Various power standard specifications may require power devices to meet several requirements for over-voltage transients. Such power standards may include requirements, such as having devices maintain normal operation under certain over-voltage conditions for a defined period of time. For example, in a standard for military use, the electrical equipment may need to survive the highest surge of about 80V for a period of 80 milliseconds on a 28V system. In another standard for military use, the electrical equipment may need to survive the highest surge of about 202V on the 28V system. In some other embodiments, data centers may use DC power distribution system(s) to provide greater reliability and operating efficiency and these DC power distribution system(s) may be vulnerable to transients, and thus the protection is required to maintain stable power supplies for the data centers. Still other power standards may define additional voltage surge and timing requirements. Even apart from power standards, power systems can benefit from improved robustness, fault protection, and safety by being able to maintain operations during anomalous conditions. Disclosed embodiments may address these and other challenges associated with power conversion systems.

Disclosed embodiments may include one or more controllers to control, for example, the startup and operation of disclosed embodiments. Controller(s) and control mechanisms may be implemented in various methods including analog control, digital control, and mixed analog and digital control. These control mechanisms can be implemented or integrated within the embodiments themselves or implemented as a microprocessor, a microcontroller, a digital signal processor (DSP), register-transfer level (RTL) circuitry, and/or combinatorial logic.

Disclosed embodiments may include one or more MOSFETs. In embodiments, a MOSFET may refer to any field effect transistor (FET) having an insulated gate whose voltage determines the conductivity of the transistor. In some embodiments, MOSFETS may encompass insulated gates having a metal or metal-like, insulator, and/or semiconductor structure. The metal or metal-like structures may include at least one electrically conductive material (such as aluminum, copper, other metal, highly doped polysilicon, graphene, or other electrical conductor). The insulator structures may include at least one insulating material (such as silicon oxide or other dielectric material). The semiconductor structures may include at least one semiconductor material.

Circuits and devices in accordance with the present disclosure may be used alone or in combination with other components, circuits, and devices. Embodiments may be fabricated as integrated circuits (ICs), which may be encased in IC packages and/or in modules for ease of handling, manufacture, and/or improved performance. For example, IC embodiments of the present disclosure may be used in modules in which one or more of such ICs are combined with other circuit components or blocks (e.g., filters, amplifiers, passive components, and possibly additional ICs) into one package. The ICs and/or modules may be then combined with other components, such as on a printed circuit board, to form part of an end product such as a cellular telephone, laptop computer, or electronic tablet, or to form a higher-level module which may be used in a wide variety of products, such as vehicles, test equipment, computing devices, industrial devices, medical devices, etc.

FIG. 1 is a diagram illustrating an exemplary power converter 100, in accordance with some embodiments of the present disclosure. As shown in FIG. 1, the power converter 100 may be configured to convert an input voltage Vin from a first terminal 102 to an output voltage Vout at a second terminal 104. The power converter 100 may include a protection circuit 110, a power conversion circuit, such as a charge pump circuit 120 electrically coupled to the protection circuit 110, and a second-stage converter 130 electrically coupled to the charge pump circuit 120. The second-stage converter 130 may include a buck converter, a boost converter, a charge pump circuit, or any other types of converter circuits. In various embodiments, the power converter 100 may have different operating ranges for different applications, such as an energy management system in large-scale data centers, a vehicle electrical system in automotive applications, etc.

In some embodiments, the protection circuit 110 may include a protection device 112, which may or may not be switching, between the first terminal 102 (e.g., an input terminal configured to receive the input voltage Vin across an input capacitor Cin) and the charge pump circuit 120. The protection device 112 may be configured to provide a current path between the first terminal 102 and the input node of the charge pump circuit 120. In some embodiments, under fault conditions, the protection device 112 may turnoff to disconnect the current path to isolate and protect components within the charge pump circuit 120 and the second-stage converter 130 from damages due to large currents or voltage levels exceeding the safe value. As shown in FIG. 1, in some embodiments, the protection device 112 may include one power metal-oxide-semiconductor field-effect transistor (MOSFET) device.

The protection circuit 110 may be used as a voltage standoff device to withstand a sufficiently large voltage between the first terminal 102 and the input node of the charge pump circuit 120 during a transient over-voltage condition, to maintain normal operation of the power converter 100 without triggering the isolation. Particularly, such transient over-voltage conditions may occur in the power system due to the load transients when the load is turned on or off. In some cases, the hot switching or hot-plug situations may cause significant switching transients, including peak voltage overshoots or high inrush currents.

In some embodiments, to protect the second-stage converter 130 and maintain the normal operation of the power converter 100, the protection device 112 can operate in a saturation region during a surge, thus presenting a higher impedance to the input terminal 102, so the excessive voltage over a maximum safe voltage for the charge pump circuit 120 may be dropped across the protection device 112 and dissipated as heat. Accordingly, the input voltage (e.g., voltage V1) for the charge pump circuit 120 may be guaranteed to be within a designed range when a transient over-voltage occurs on the input voltage Vin.

As shown in FIG. 1, in addition to the protection device 112, the protection circuit 110 may also include a voltage clamping circuit such as a Zener diode 114 whose reverse break-down voltage meets clamping voltage requirement, a resistor 116, and a charge pump circuit 118. The Zener diode 114 may be electrically coupled between a control terminal of the protection device 112 and the ground. In the embodiment of FIG. 1, the protection device 112 is a MOSFET device whose gate terminal functions as the control terminal and therefore "control terminal," "gate terminal," and/or "gate" may be used interchangeably to describe the same function in the description below. Similarly, the voltage on the control terminal (i.e., gate terminal) can be described as a "control voltage" or a "gate voltage" and used interchangeably. The resistor 116 and the charge pump circuit 118 may be electrically coupled in series between the input node of the charge pump circuit 120 and the control terminal of the protection device 112. These components may collectively form an over-voltage protection circuit to keep the voltage V1 received by the charge pump circuit 120 at a clamping level when the input voltage Vin exceeds a threshold value, so the charge pump circuit 120 and the second-stage converter 130 are not affected by the transient over-voltage and may continue to perform power conversion operations and regulate the output voltage Vout across an output capacitor Cout to a next-stage circuit or a load.

In some embodiments, the charge pump circuit 118 may be configured to maintain a constant voltage difference (e.g., 5V) between an input and an output of the charge pump circuit 118. The resistor 116 may be used to increase the output resistance of the charge pump circuit 118. Accordingly, during an over-voltage condition at the input terminal 102, the Zener diode 114 can turn-on when the control terminal of the protection device 112 exceeds the Zener diode reverse breakdown voltage. The Zener diode 114 is able to gain and maintain control of the protection device 112 by superseding the voltage imposed by charge pump circuit 118 due to an explicit resistor 116 and/or output impedance presented by charge pump 118, limiting its ability to impose its voltage on the control terminal of the protection device 112.

By this arrangement, Zener diode 114 may be configured to clamp the control voltage of the protection device 112, so that the protection device 112 may operate in the saturation region when the input voltage Vin exceeds the voltage threshold value. Particularly, in the saturation region, the voltage between the gate and the source ($V_{GS}$) of the protection device 112 may be greater than the threshold voltage ($V_{th}$), and the voltage between the drain and the source ($V_{DS}$) of the protection device 112 may be greater than ($V_{GS}-V_{th}$). In other words, the following equations (1) and (2) may be satisfied when the protection device 112 operates in the saturation region:

$$V_{GS} > V_{th} \quad (1)$$

$$V_{DS} > V_{GS} - V_{th} \quad (2)$$

Accordingly, when the transient over-voltage occurs, the protection device 112 may saturate and the drain-to-source voltage, $V_{DS}$, may increase until reaching the standoff voltage required to protect the charge pump circuit 120 by clamping the input voltage V1 seen by the charge pump circuit 120 to a desired value (e.g., 15V) within the safe range.

In some embodiments, other devices or circuits may also be used in the protection circuit 110 to achieve the clamping of the control terminal of the protection device 112. For example, in various embodiments, the voltage clamping circuit in the protection circuit 110 may be achieved by one or more diodes coupled in series, one or more transistors, and/or other semiconductor devices, acting alone or in combination. It would be appreciated that the voltage clamping circuit can be realized by different circuit topologies or structures, and thus the embodiment depicted in FIG. 1 is an example and not meant to be limiting.

Figure 2:
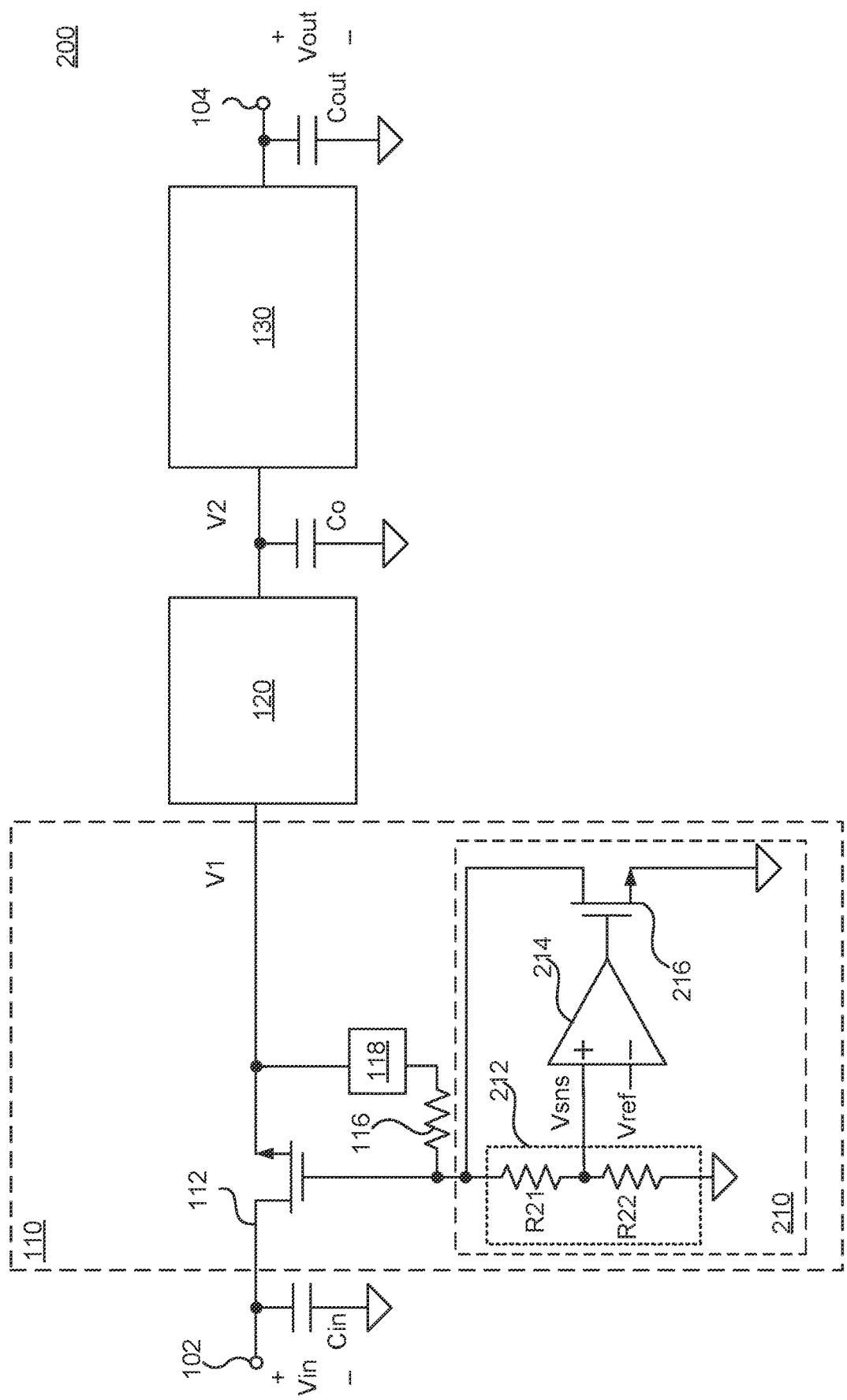
FIG. 2 is a diagram illustrating another exemplary power converter, in accordance with some embodiments of the present disclosure.

FIG. 2 is a diagram illustrating another exemplary power converter 200, in accordance with some embodiments of the present disclosure. Compared to the Zener diode within the protection circuit 110 of the power converter 100 of FIG. 1, in the power converter 200, the protection circuit 110 may include a clamping circuit 210 for controlling the control voltage of the protection device 112. As shown in FIG. 2, the clamping circuit 210 may include a voltage divider 212, an error amplifier 214, and a pull-down device 216 used for clamping the voltage on the control terminal of the protection device 112. The voltage divider 212 may include voltage divider resistors R21 and R22, and configured to output a sensing voltage Vsns in response to the control voltage of the protection device 112. The error amplifier 214 may be electrically coupled to the resistors R21 and R22 and configured to compare the sensing voltage Vsns with a reference voltage Vref. The pull-down device 216 may be electrically coupled between the control terminal (i.e., the gate terminal) of the protection device 112 and a ground terminal. The output terminal of the error amplifier 214 may be electrically coupled to a control terminal (e.g., the gate terminal) of pull-down device 216. Accordingly, the resistors R21 and R22, the error amplifier 214 and the pull-down device 216 may form a feedback circuit.

When the input voltage Vin rises and exceeds the voltage threshold value, the rising control voltage may be observed by the resistors R21 and R22, and the sensing voltage Vsns may also rise. Accordingly, the error amplifier 214 may be configured to compare the sensing voltage Vsns and the reference voltage Vref to output a corresponding signal to control the pull-down device 216 and thus clamp the control voltage of the protection device 112.

By the arrangement of the clamping circuit 210, which mimics a Zener diode, the protection circuit 110 can achieve the clamping of the control terminal of the protection device 112. In various embodiments, the clamping circuit 210 may be implemented by different circuit components or configurations. For example, the clamping circuit 210 may be formed by multiple diodes or transistors coupled in a stack. The clamping circuit 210 depicted in FIG. 2 is merely an example and not meant to limit the present disclosure.

Figure 3:
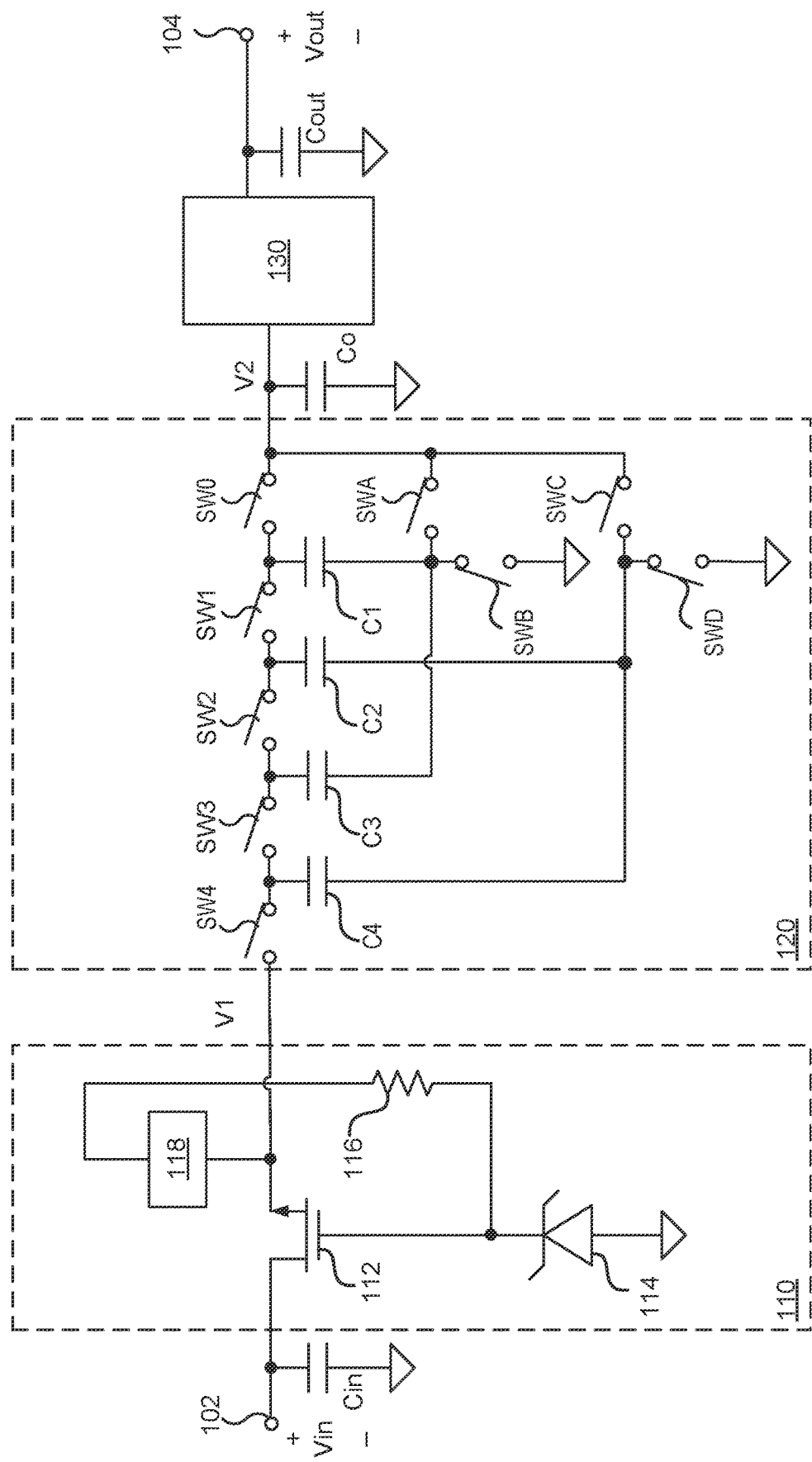
FIG. 3 is a diagram illustrating an exemplary charge pump circuit within the power converter, in accordance with some embodiments of the present disclosure.

FIG. 3 is a diagram illustrating an exemplary charge pump circuit 120 within the power converter 100, in accordance with some embodiments of the present disclosure. In the embodiments shown in FIG. 3, the charge pump circuit 120 may be a Dickson charge pump using switches SW0-SW4, and SWA-SWD to control the connection of the supply voltage across the load through capacitors C1-C4. Particularly, the charge pump circuit 120 may be configured to step-down the voltage V1 received from the input node, via the protection device 112 in an ON condition, by storing a portion or multiples of the voltage V2 across capacitors C1-C4. Each capacitor C1-C4 may help create an intermediate voltage during part of the operating cycle. As the magnitude of the transformation increases, the number of capacitors used in the charge pump may increase. In other configurations (e.g., by exchanging the input node and the output node of the charge pump circuit 120 to have the voltage V2 as the input voltage), a charge pump circuit may also be configured to step-up the input voltage received from the input node.

The switches SW0-SW4, and SWA-SWD may be used to re-arrange the capacitors C1-C4 into different configurations. In some embodiments, the switches SW0-SW4, and SWA-SWD may be configured to switch between two different configurations. Accordingly, capacitors C1-C4 may form a first capacitor network in response to the first configuration of the switches SW0-SW4, and SWA-SWD, and form a second capacitor network in response to the second configuration of the switches SW0-SW4, and SWA-SWD.

In FIG. 3, an exemplary Dickson charge pump may be in a 5:1 (step-down) configuration (or 1:5—step-up—if the power flow is reversed, i.e., power flow from V2 to V1), but the present disclosure is not limited thereto. In various embodiments, the step-down or step-up configurations can be applied to all possible charge pump ratios. For example, in other embodiments, the Dickson charge pump may also be in a 2:1 configuration, with the input voltage V1 of 10V and the output voltage Vout of 5V.

During a first operation stage, switches SW0, SW2, SW4, SWB, and SWC are on, while remaining switches SW1, SW3, SWA and SWD are off. During a second operation stage, switches SW0, SW2, SW4, SWB, and SWC are off, while remaining switches SW1, SW3, SWA and SWD are on.

By controlling the switches SW0-SW4, and SWA-SWD switching between the first and the second configurations in different operation stages, the charge pump circuit 120 may achieve the voltage conversion to output an output voltage V2 across a capacitor Co at a desired level (e.g., around 4V) in response to the input voltage Vin at a normal operating level (e.g., around 20V). It would be appreciated that voltage values provided in the embodiments of FIG. 3 are merely examples for the ease of understanding. In various embodiments, the number of switches and capacitors in the charge pump, the voltage ratings of the switches and the capacitors, the input voltage V1, and the output voltage V2 may be designed based on practical needs for different applications.

Accordingly, the charge pump circuit 120 may output, via its output node, the output voltage V2 to the next stage circuit, such as the second-stage converter 130. The second-stage converter 130 may be configured to convert and regulate the voltage V2 to the output voltage Vout, and then output the regulated output voltage Vout to the second terminal 104, which may be an output terminal configured to output the output voltage Vout to the next stage circuit, such as any other regulator circuits, filtering circuits, or loads, connected to the second terminal 104.

As shown in FIG. 3, each stage in the Dickson charge-pump may see a small fraction of the total voltage (e.g., 20V) at the high voltage side of the charge pump circuit 120. Accordingly, it is possible to use devices with a relatively lower voltage rating to improve the efficiency. When the input voltage Vin from the first terminal 102 rises rapidly and suddenly (e.g., from the normal level 20V to 60V) due to and input transient and/or indirectly through a load transient, the protection device 112 operating in the saturation region may withstand the excessive voltage and keep the voltage V1 under a maximum safe voltage (e.g., 25V). Thus, the low-voltage switches SW0-SW4, and SWA-SWD within the charge pump circuit 120 may not experience the extreme over-voltage stress that may result in damages to the power devices.

In some embodiments, the charge pump circuit 120 and the protection device 112 may share one or more power switches to further reduce the cost and/or the chip area for the circuit design. For example, the protection device 112 and the switch SW4, which is the first stage switch of the charge pump circuit 120 can be implemented by a single FET device. Alternatively stated, the protection device 112 in the protection circuit 110 may also serve as the switch SW4 within the charge pump circuit 120.

Figure 4:
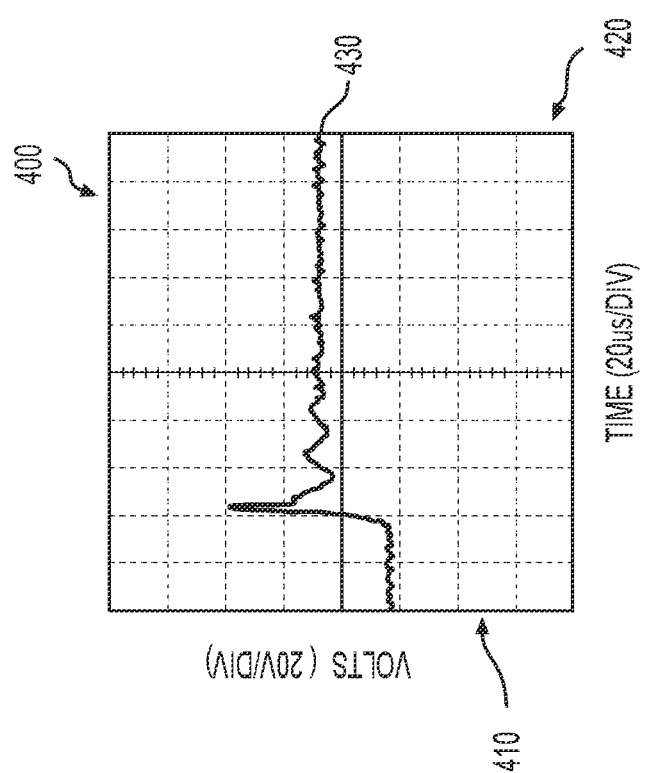
FIG. 4 is a diagram illustrating waveforms of input voltage transients on input terminal during a hot-plug event, in accordance with some embodiments of the present disclosure.

In accordance with some embodiments of the present disclosure, FIG. 4 is a diagram 400 illustrating waveforms of input voltage transients across ceramic input capacitors during a hot-plug event where an input supply that is already powered-up is connected instantaneously through a wire or cable having parasitic inductance to a power converter without given a chance for the input supply to power-up in a controlled fashion. In some embodiments, the parasitic inductance of the wire along with high-Q ceramic input capacitor (e.g., capacitor $C_{IN}$ in FIGS. 1-3) in the power system may cause oscillations, ringing, and result in the overshoot. As illustrated in FIG. 4, a curve 430, shows the input voltage transients for the capacitor $C_{IN}$ with the parasitic inductor of the wire, showing a measured voltage value in Y-axis 410 as a function of time, shown in X-axis 420.

For example, in the curve 430, which shows a transient with the 10 μF capacitor and a 1 pH parasitic inductor, the voltage across the capacitor $C_{IN}$ may peak at around 57.2V with a DC input voltage of 24V. The next-stage circuits (e.g., the charge pump circuit 120 and the second-stage converter 130) may not be able to survive under the over-voltage condition in the curves 430.

In some embodiments, other types of high ESR capacitors (e.g., electrolytic capacitors) coupled in parallel with the ceramic capacitor may be introduced in the power system to de-Q the capacitor network and prevent over-shoot during the hot-plug events.

Figure 5A:
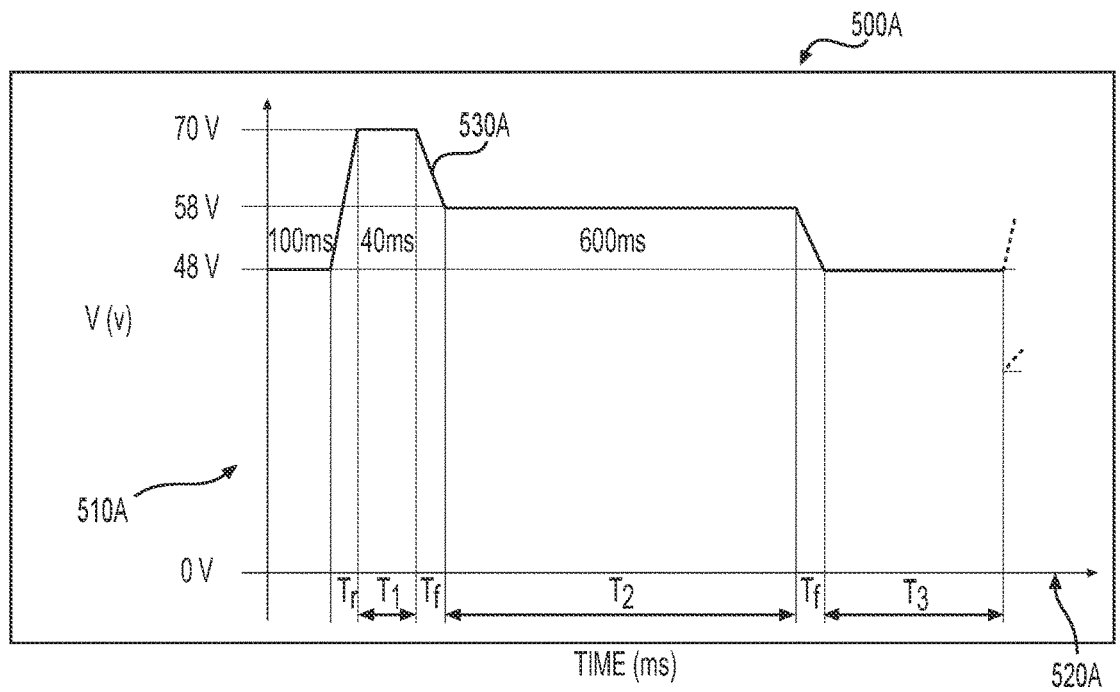
FIG. 5A is a diagram illustrating waveforms for transient overvoltage requirements of an exemplary standard, in accordance with some embodiments of the present disclosure.

FIG. 5A is a diagram 500A illustrating waveforms for transient overvoltage requirements of LV148 Standard, in accordance with some embodiments of the present disclosure. As illustrated, a curve 530A represent exemplary testing voltages simulating the transient over-voltages in LV148 Standard, showing a test voltage in Y-axis 510A as a function of time, shown in X-axis 520A. LV148 refers to a standard of Electric and Electronic Components for Vehicles with a 48V Electrical System Test Conditions and Tests.

In FIG. 5A, the curve 530A may depict a test in the LV148 for the transient over-voltages that may occur in the electric system due to turning off loads. As curve 530A depicts, the voltage on the 48-V rail may go up to 70V and stay at that level for 40 milliseconds. The device under test (DUT) may need to survive this event and perform the functions. That is, integrated circuits connected directly to the 48-V rail may need to withstand 70V under all conditions. During the test, the testing voltage may rise, within a rise time Tr of 1 millisecond, from a minimum voltage Vmin of 48V to a maximum voltage Vmax of 70V. The voltage may be kept at the maximum voltage Vmax for a time period T1 of 400 milliseconds, and then may fall, within the fall time Tf of 1 millisecond, to the voltage of 58V for a time period T2 of 600 milliseconds. Then, the voltage may fall, within the fall time Tf of 1 millisecond, to the voltage of 48V for a time period T3. The time period T3 may be 2.5 seconds for a short test, or may be 9 seconds for a long test.

Figure 5B:
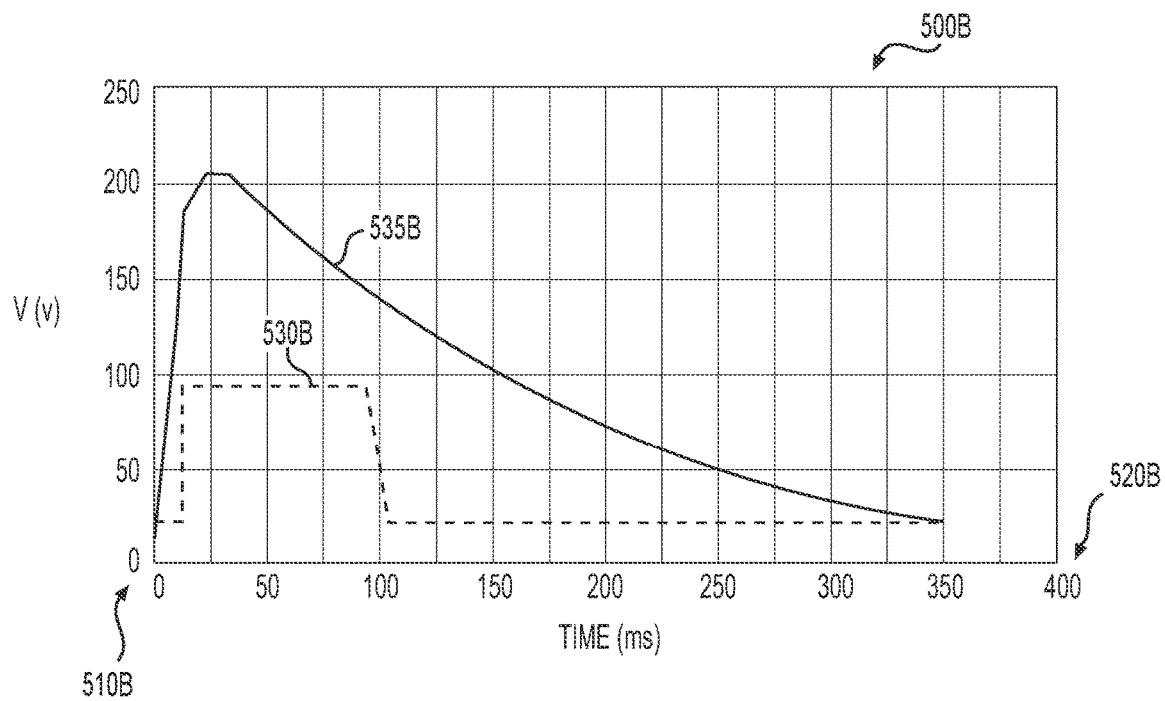
FIG. 5B is a diagram illustrating waveforms for transient overvoltage requirements of another exemplary standard, in accordance with some embodiments of the present disclosure.

FIG. 5B is a diagram 500B illustrating example waveforms for transient overvoltage requirements of UK Defense Standard for 28V system, in accordance with some embodiments of the present disclosure. As illustrated, curves 530B and 535B represent exemplary requirements for withstanding the transient over-voltages in the issue 5 and the issue 6 of the UK Defense Standard for 28V system, showing the voltage requirement (V) in Y-axis 510B as a function of time, shown in X-axis 520B.

In FIG. 5B, the curve 530B depicts example requirements for withstanding the transient over-voltages that may occur in the electric system in the issue 5 of Defense Standard. In the issue 5 standard, the electrical equipment may need to survive the highest surge of about 80V for a period of 80 milliseconds on a 28V system. The curve 535B may depict the requirements for withstanding the transient over-voltages that may occur in the electric system in the issue 6 of Defense Standard. In the issue 6 standard, the electrical equipment may need to survive the highest surge of about 202V on a 28V system.

FIG. 5C is a diagram 500C illustrating exemplary waveforms of the input voltage Vin of the power converter 100 and the clamped input voltage V1 seen by the charge pump circuit 120, in accordance with some embodiments of the present disclosure. As illustrated, curves 530C and 535C respectively represent exemplary waveforms of the input voltage Vin and the clamped input voltage V1, showing the voltage value (V) in Y-axis 510C as a function of time, shown in X-axis 520C.

As shown in FIG. 5C, during a large over-voltage (e.g., rising from a typical level of 12V to an overshoot level of 60V with a rising time of 1 microsecond) of the input voltage Vin, the protection circuit 110 may clamp the input voltage V1 seen by the charge pump circuit 120 at a desired level (e.g., 15V) to protect the charge pump circuit 120. It would be appreciated that voltage values and other parameters provided in the embodiments of FIGS. 4 and 5A-5C are merely examples, and not meant to limit the present disclosure.

Figure 6:
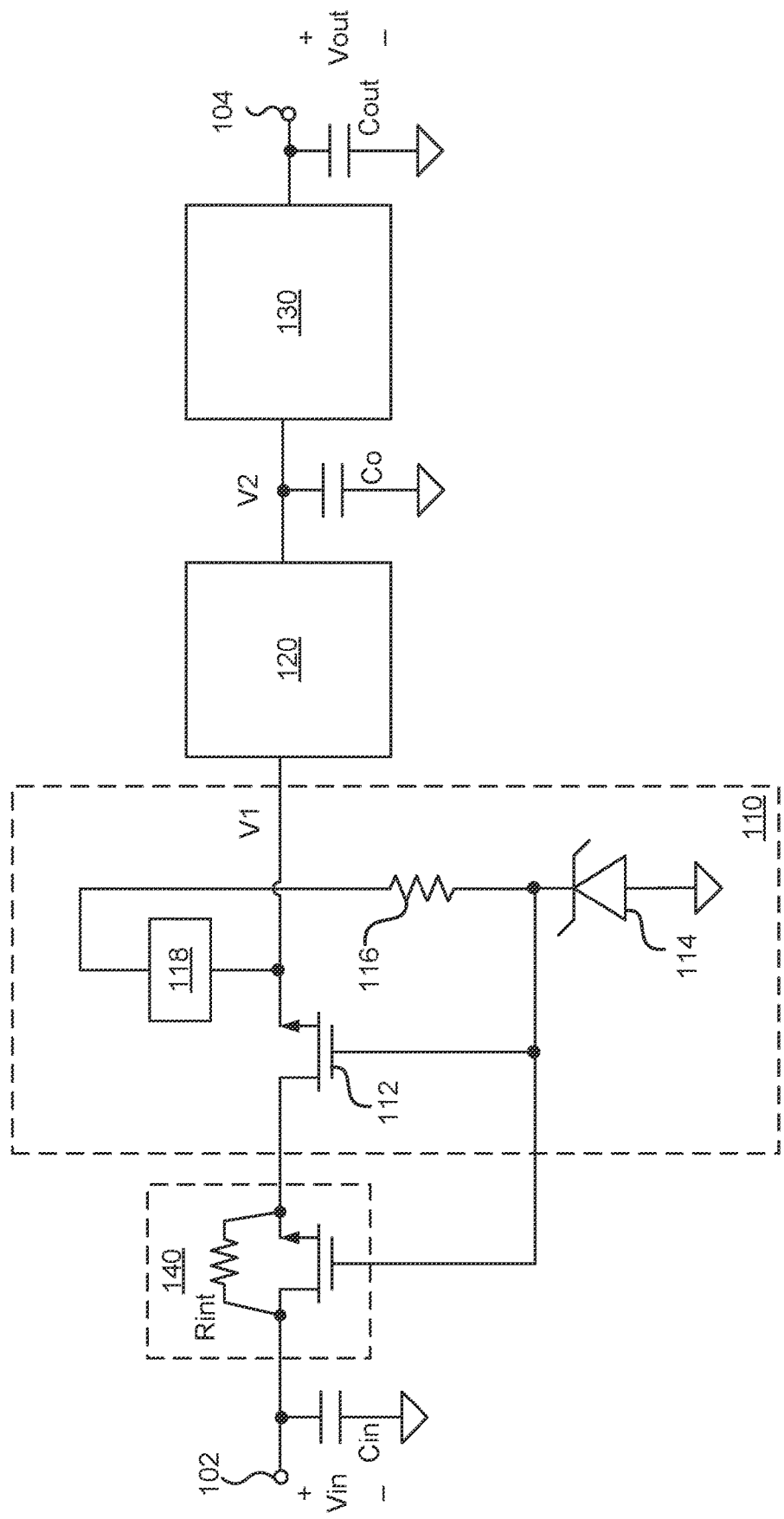
FIG. 6 is a block diagram illustrating an exemplary power converter, in accordance with some embodiments of the present disclosure.

FIG. 6 is a block diagram illustrating a power converter 600, in accordance with some embodiments of the present disclosure. Compared to the power converter 100 of FIG. 1 or the power converter 200 of FIG. 2, the power converter 600 further include a second protection device 140 electrically coupled between the first terminal 102 and the protection device 112. As shown in FIG. 6, the protection device 140 may be a High Voltage transistor device (e.g., a FET device, a HEMT device, etc.), and the control terminal (i.e., gate terminal) of the protection device 140 may be electrically coupled to the control terminal (i.e., gate terminal) of the protection device 112. Accordingly, if the over-voltage stress across the protection device 112 exceeds the standoff capability of the protection device 112, the external discrete transistor in the protection device 140 with a larger voltage standoff capability can be used to block the significant transients that are over the tolerance range given for the protection circuit 110. Particularly, the gate terminal of the external FET can also be clamped by the Zener diode 114. In some embodiments, a dedicated pin can be used for accessing the gate of the external discrete transistor, but the present disclosure is not limited thereto.

In some embodiments, the power converter 600 may further include an initial charge resistor Rint electrically coupled to the protection device 140 in parallel. The initial charge resistor Rint (e.g., around 1KΩ-10KΩ) may be configured to detect the input voltage Vin during an initialization period for start-up functions.

Figure 7:
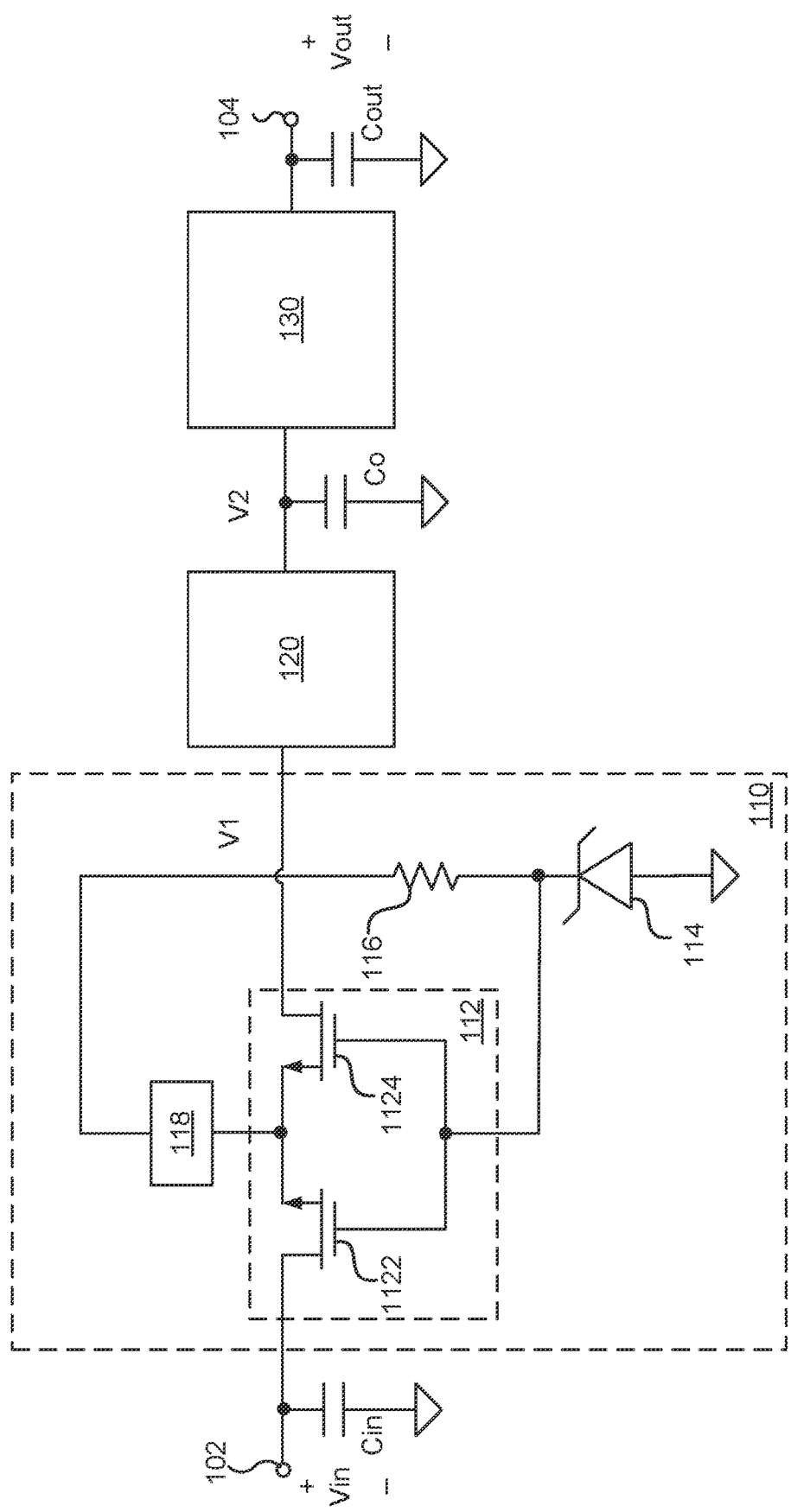
FIG. 7 is a block diagram illustrating another exemplary power converter, in accordance with some embodiments of the present disclosure.

FIG. 7 is a block diagram illustrating a power converter 700, in accordance with some embodiments of the present disclosure. Compared to the power converter 100 of FIG. 1 or the power converter 200 of FIG. 2, in the power converter 700, the protection device 112 may be a bidirectional device including two, instead of one, power MOSFET devices 1122 and 1124. As shown in FIG. 7, the power MOSFET devices 1122 and 1124 may have body diodes coupled in anti-series connection.

Particularly, the protection device 112 of FIG. 7 may be configured to restrict or block a power flow from the first terminal 102 to the second terminal 104, and also block the power flow from the second terminal 104 to the first terminal 102. Alternately stated, the protection circuit 110 can support bidirectional current flow when the protection device 112 is in the ON condition, and support bidirectional voltage blocking when the protection device 112 is in saturation or completely turned OFF. Because the protection circuit 110 blocks the current path in both directions, components in a previous stage (e.g., "upstream" components) before the power converter 100, components in the charge pump circuit 120 or the second-stage converter 130, and components in the next stage (e.g., "downstream" components) after the power converter 100 can be protected from damages under the fault conditions.

The "anti-series connection" means that either the anode terminals of the body diodes of the power MOSFET devices may be coupled to each other, e.g., the configuration of the power MOSFET devices 1122 and 1124 shown in FIG. 7, or the cathode terminals of the body diodes of the power MOSFET devices are coupled to each other. Accordingly, the body diodes may have opposite forward directions. When the power MOSFET devices 1122 and 1124 are both off, one body diode may block the current in one direction, and the other body diode may block the current in the other direction. By this anti-series connection of the power MOSFET devices 1122 and 1124, the protection device 112 can block the power flow in both directions between the input terminal and the output terminal of the power converter 100, and prevent potential damages caused in the fault conditions.

In some embodiments, gate terminals of the power MOSFET devices 1122 and 1124 may be electrically coupled to each other, so the power MOSFET devices 1122 and 1124 can be controlled at the same time, but the present disclosure is not limited thereto. In addition, the power MOSFET devices 1122 and 1124 may be MOSFET devices with different power ratings, while in some other embodiments, the power MOSFET devices 1122 and 1124 may be MOSFET devices with the same power rating.

Different types of MOSFET devices may be used and different arrangements may be applied to achieve the protection device 112 with the anti-series connection configuration. For example, in some embodiments, the power MOSFET devices 1122 and 1124 may be both n-type MOSFET devices, and may be anti-series connected in a common source configuration (e.g., the source terminals of the MOSFETs are coupled to each other) or anti-series connected in a common drain configuration (e.g., the drain terminals of the MOSFETs are coupled to each other). In some other embodiments, the power MOSFET devices 1122 and 1124 may be both p-type MOSFET devices, anti-series connected in the common source configuration or the common drain configuration.

In yet some other embodiments, the protection device 112 may be realized by one p-type MOSFET device and one n-type MOSFET device. For example, the drain terminal of the p-type MOSFET device may be coupled to the source terminal of the n-type MOSFET device to achieve the anti-series connection configuration with body diodes coupled in anti-series connection, or the source terminal of the p-type MOSFET device may be coupled to the drain terminal of the n-type MOSFET device to achieve the anti-series connection configuration with body diodes coupled in anti-series connection. In addition, the protection device 112 may also include three or more MOSFET devices electrically coupled in series, in which the body diodes are coupled in anti-series connection.

Figure 8:
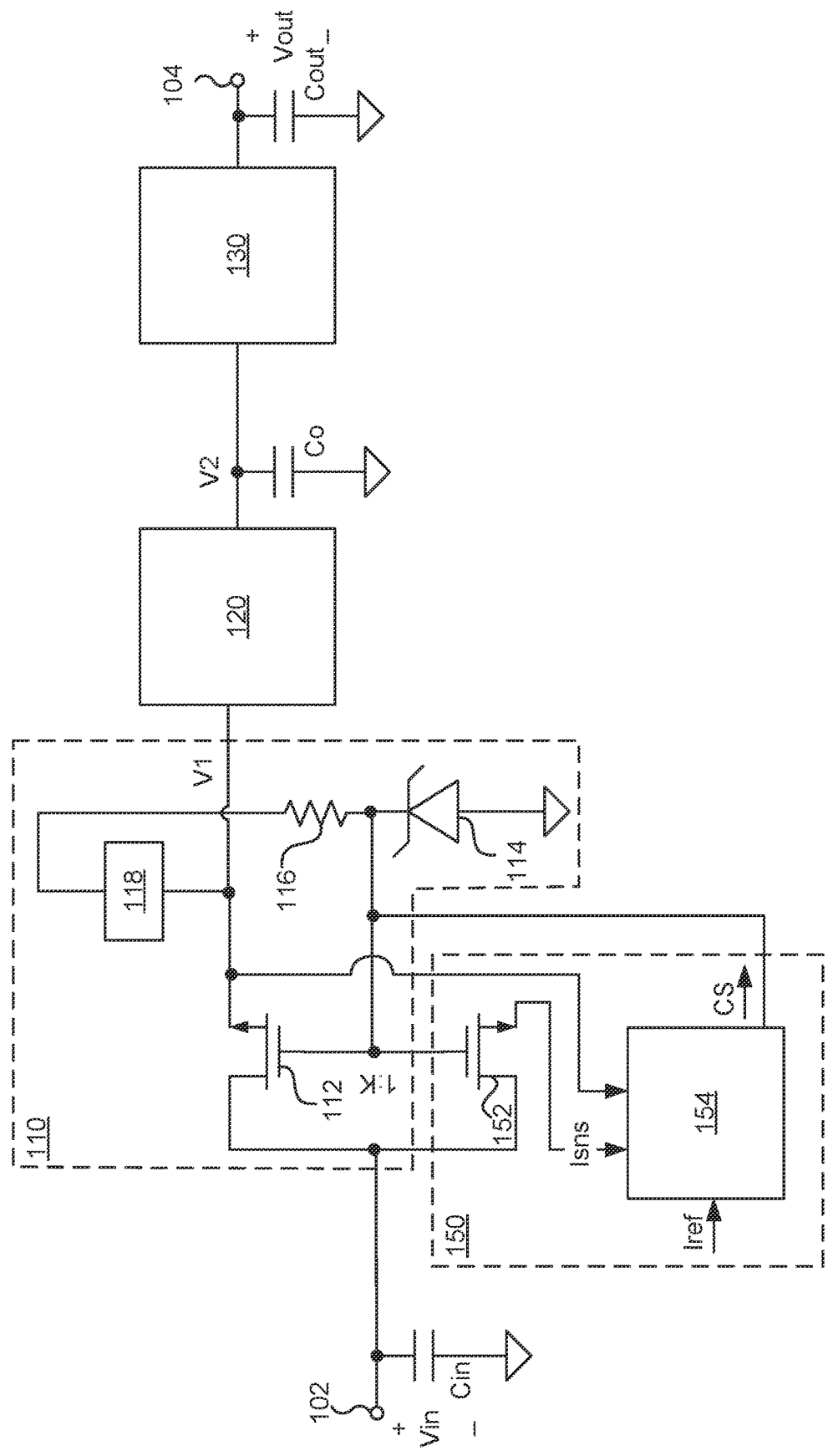
FIG. 8 is a block diagram illustrating yet another exemplary power converter, in accordance with some embodiments of the present disclosure.

FIG. 8 is a block diagram illustrating a power converter 800, in accordance with some embodiments of the present disclosure. Compared to the power converter 100 of FIG. 1, the power converter 800 further includes an over-current detection circuit 150. As shown in FIG. 8, the over-current detection circuit 150 includes a current sensing device 152, and a control circuit 154 electrically coupled to the current sensing device 152. The current sensing device 152 functions as a current sensing circuit configured to output a sensing current Isns in response to the input current Iin flowing through device 112. The control circuit 154 is configured to receive the sensing current Isns and output a control signal CS to the control terminal of the protection device 112 in the protection circuit 110 when the sensing current Isns exceeds a current threshold value, which can be configured by a reference current Iref. In some embodiments, the current sensing device 152 may be a replica FET device, which is sized substantially lower. The gate of the current sensing device 152 may be connected to the gate of the protection device 112, forming a current scaler circuit and resulting in the sensing current Isns flowing through the current sensing device 152, which may be equal to 1/K times the input current Iin flowing through the protection device 112, where K is a replica scaling factor.

Accordingly, when an over-current occurs, the control circuit 154 may vary the control signal CS to control the protection device 112 within the protection circuit 110, to limit the current or block the current path from the first terminal 102 to the charge pump circuit 120. As explained in the embodiments of FIG. 7, in some embodiments, the protection device 112 may be a bidirectional device and able to restrict or block the current path and the power flow in both directions, in response to the control signal CS.

Figure 9:
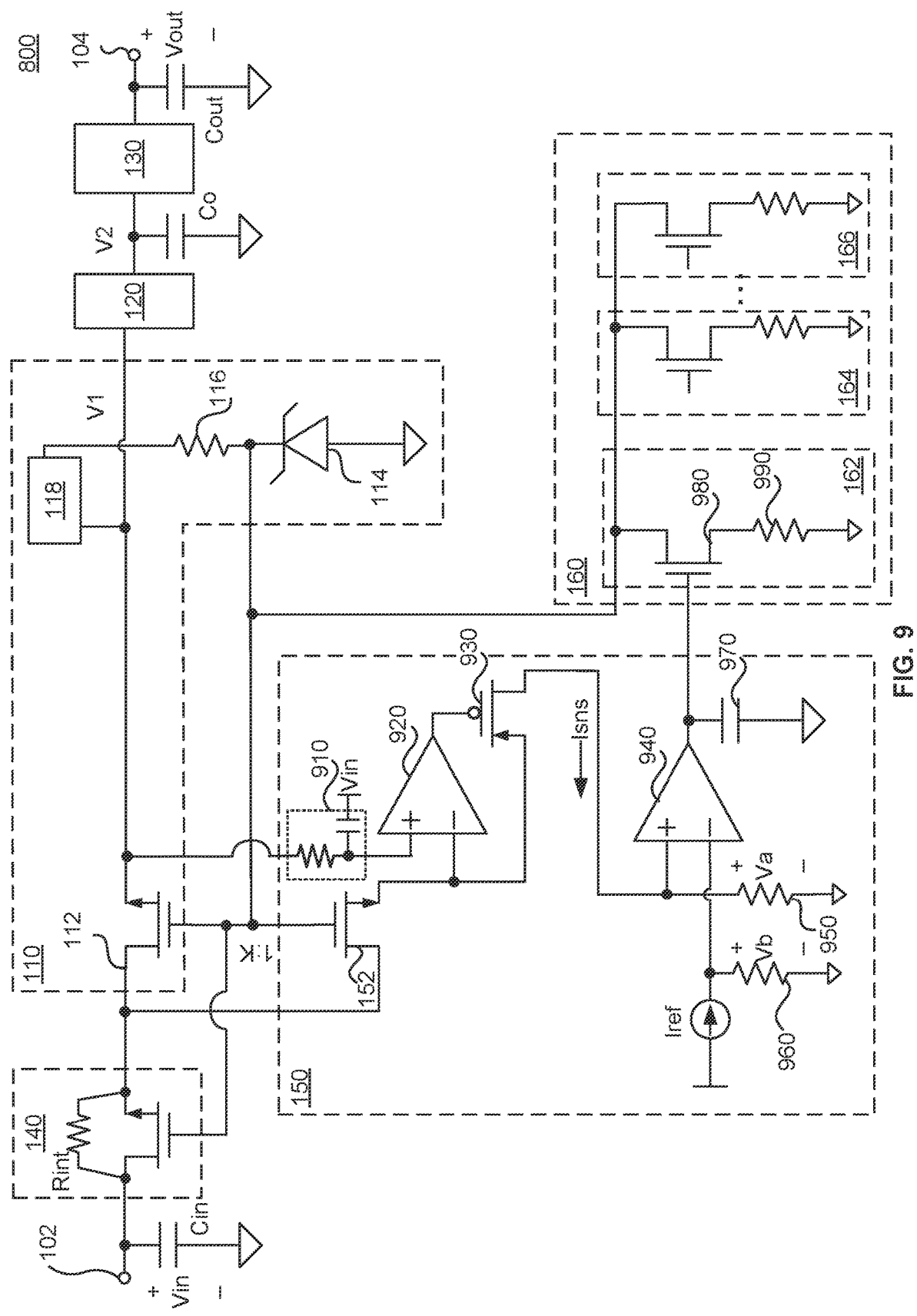
FIG. 9 is a block diagram illustrating an exemplary circuit configuration of the over-current protection circuit of FIG. 8, in accordance with some embodiments of the present disclosure.

FIG. 9 is a block diagram illustrating an exemplary circuit configuration of the over-current detection circuit 150 in the power converter 800 of FIG. 8, in accordance with some embodiments of the present disclosure. As shown in FIG. 9, in some embodiments, the power converter 800 may include both the second protection device 140 in FIG. 6 and the over-current detection circuit 150 in FIG. 8. As shown in FIG. 9, in some embodiments, the over-current detection circuit 150 may further include an RC low pass filtering circuit 910 having a resistor and a capacitor connecting together in series, a first error amplifier 920, a voltage standoff device 930, a second error amplifier 940, resistors 950 and 960, and an output capacitor 970 coupled between the output of the error amplifier 940 and the ground. The filtering circuit 910 may be electrically coupled between the input node of the charge pump circuit 120 and a non-inverting input of the error amplifier 920, while an inverting input of the error amplifier 920 may be coupled to the current sensing device 152. An output of the error amplifier 920 may be coupled to the gate of the voltage standoff device 930 for controlling device 930.

By this configuration, when the voltage standoff device 930 is on, the sensing current Isns may flow, via device 930 and the resistor 950. The reference current Iref, on the other hand, may flow through the resistor 960. The second error amplifier 940 may be electrically coupled to the resistors 950 and 960 via the two input terminals and may be configured to determine whether the sensing current Isns exceeds the current threshold value by comparing the voltage Va across the resistor 950 (which is proportional to the sensing current Isns) and the voltage Vb across the resistor 960 (which is proportional to the reference current Iref).

As shown in FIG. 9, the output of the error amplifier 940 may be electrically coupled to a corresponding control branch 162 formed by a pull-down device 980 and a resistor 990 coupled in series within the control circuit 160. Particularly, the output of the error amplifier 940 may be coupled to the gate of a device 980, which may be electrically coupled between the gate of the protection device 112 and the resistor 990, while the other end of the resistor 990 may be coupled to the ground. Accordingly, when the sensing current Isns exceeds the current threshold value (e.g., the voltage Va being greater than the voltage Vb), device 980 may be turned on and thus the control terminal of the protection device 112 may be pulled lower to limit the current through the protection device 112. The protection device 112 can thus be controlled to achieve the over-current protection.

In some embodiments, as shown in the drawing, the control circuit 160 may include one or multiple control branches 162, 164, and 166 coupled in parallel. Each of the control branches 162, 164, and 166 may include a control device (e.g., pull-down device 980 in the control branch 162) and a control resistor (e.g., resistor 990 in the control branch 162) coupled in series between the control terminal of device 112 and the ground terminal. The control terminal of the control device may be configured to receive a corresponding fault signal (e.g., over-current fault signal in the control branch 162). For examples, the control branches 164 and 166 may receive other fault control signals, such as an over-voltage fault signal or an under-voltage fault signal. When such a fault occurs, the corresponding control branch may be configured to lower the voltage on the control terminal of the protection device 112 to limit the fault condition and achieve the protection necessary while maintaining operation and regulation of the second terminal 104. Alternatively, the corresponding control branch can be configured to pull-down the control terminal of the protection device 112 to turn-off the power flow from input terminal 102 to the power converter 800 and thereby achieving the protection necessary while regulation of the second terminal 104 is suspended.

Figure 10:
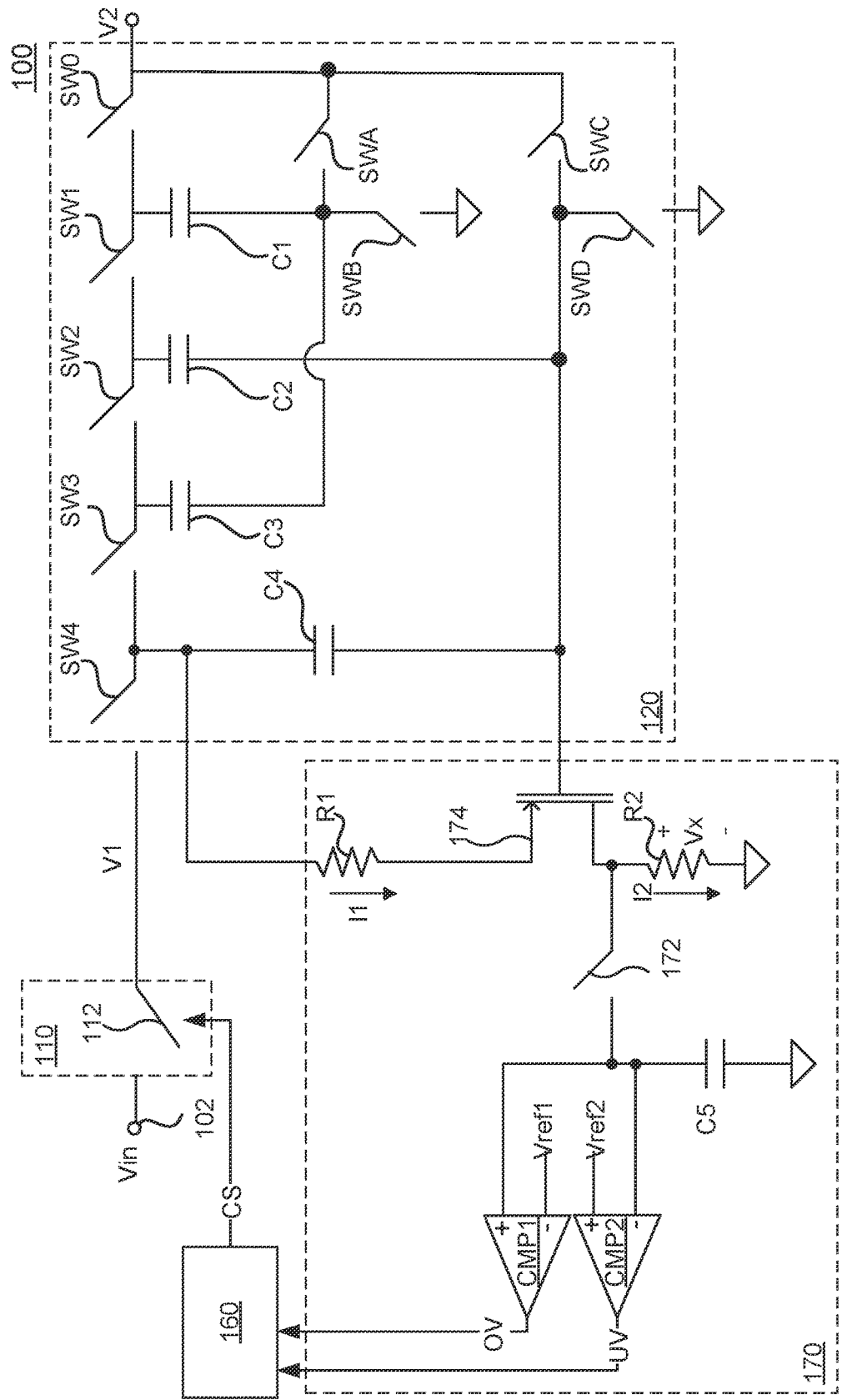
FIG. 10 is a circuit diagram illustrating an exemplary detecting circuit, in accordance with some embodiments of the present disclosure.

FIG. 10 is a circuit diagram illustrating an exemplary detecting circuit 170 applied to the detection of a fault condition on the capacitor C4 in the charge pump circuit 120, in accordance with some embodiments of the present disclosure. In various embodiments, a similar circuit can be used to monitor the voltages on each of the capacitors C2, C3 and C4, or used to monitor the input voltage V1 or the output voltage V2. Again, while a step-down Dickson charge pump is used as the charge pump circuit 120 in the embodiments of FIG. 10, in some other embodiments, various other charge pump topologies can be used.

As shown in FIG. 10, the detecting circuit 170 may include resistors R1 and R2, a switch 172, a PMOS device 174, a filtering capacitor C5, and comparators CMP1 and CMP2. In some embodiments, the PMOS device 174 may be selected to operate at the higher voltage across C4. The resistor R1 may be electrically coupled between the first terminal of the capacitor C4 and a source terminal of the PMOS device 174. The resistor R2 may be electrically coupled between the ground terminal and a drain terminal of the PMOS device 174. A gate terminal of the PMOS device 174 may be electrically coupled to the second terminal of the capacitor C4. The switch 172 may be electrically coupled between the drain terminal of the PMOS device 174 and the first terminal of the filtering capacitor C5 in the detecting circuit 170. A positive input terminal of the comparator CMP1 and a negative input terminal of the comparator CMP2 may be also electrically coupled to the first terminal of the filtering capacitor C5 to receive the sampled signal. A negative input terminal of the comparator CMP1 and a positive input terminal of the comparator CMP2 may be respectively configured to receive an over-voltage reference voltage Vref1 and an under-voltage reference voltage Vref2, which are the threshold voltages for determining whether an over-voltage fault or an under-voltage fault occurs.

Generally, the current I1 through the resistor R1 is proportional to the difference between the voltage across the capacitor C4 and the source-gate voltage of the PMOS device 174. Current I2 through the resistor R2 may be substantially identical to the current I1. By properly selecting the value of the resistor R2, the voltage Vx across the resistor R2 may be, roughly, a sampling signal of the voltage across the capacitor C4 and can be scaled down as desired. The switch 172, along with the filtering capacitor C5, may be used to allow a detection of the voltage Vx when the switch SWC is on. Comparators CMP1 and CMP2, along with the reference voltages Vref1 and Vref2, may form a so-called window comparator. An over-voltage fault signal OV or an under-voltage fault signal UV being asserted may indicate a fault condition, which may then trigger one or several of the protection mechanisms implemented.

For example, when the detecting circuit 170 that is electrically coupled to the control circuit 160 outputs one or more fault signals (e.g., the over-voltage fault signal OV or the under-voltage fault signal UV) in response to the fault, the control circuit 160 may be configured to output the corresponding control signal CS in response to the one or more fault signals to control (e.g., turn off) the protection device 112 in the protection circuit 110. As discussed in the embodiments of FIG. 7, in some embodiments, when the protection device 112 is turned off by the control signal CS, the 112 may block the power flow in both directions between the first terminal 102 of the power converter 100 and the second terminal 104 of the power converter 100.

In various embodiments, the detecting circuit 170 may output the fault signal(s) according to different signals, such as the input voltage Vin, the output voltage Vout, the charge pump capacitor voltage (e.g., a voltage across any one of the capacitors C1-C4), the input current, the output current, a thermal value, or a soft-start timeout. Alternatively stated, the fault signal(s) may include an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal, but the present disclosure is not limited thereto.

Figure 11:
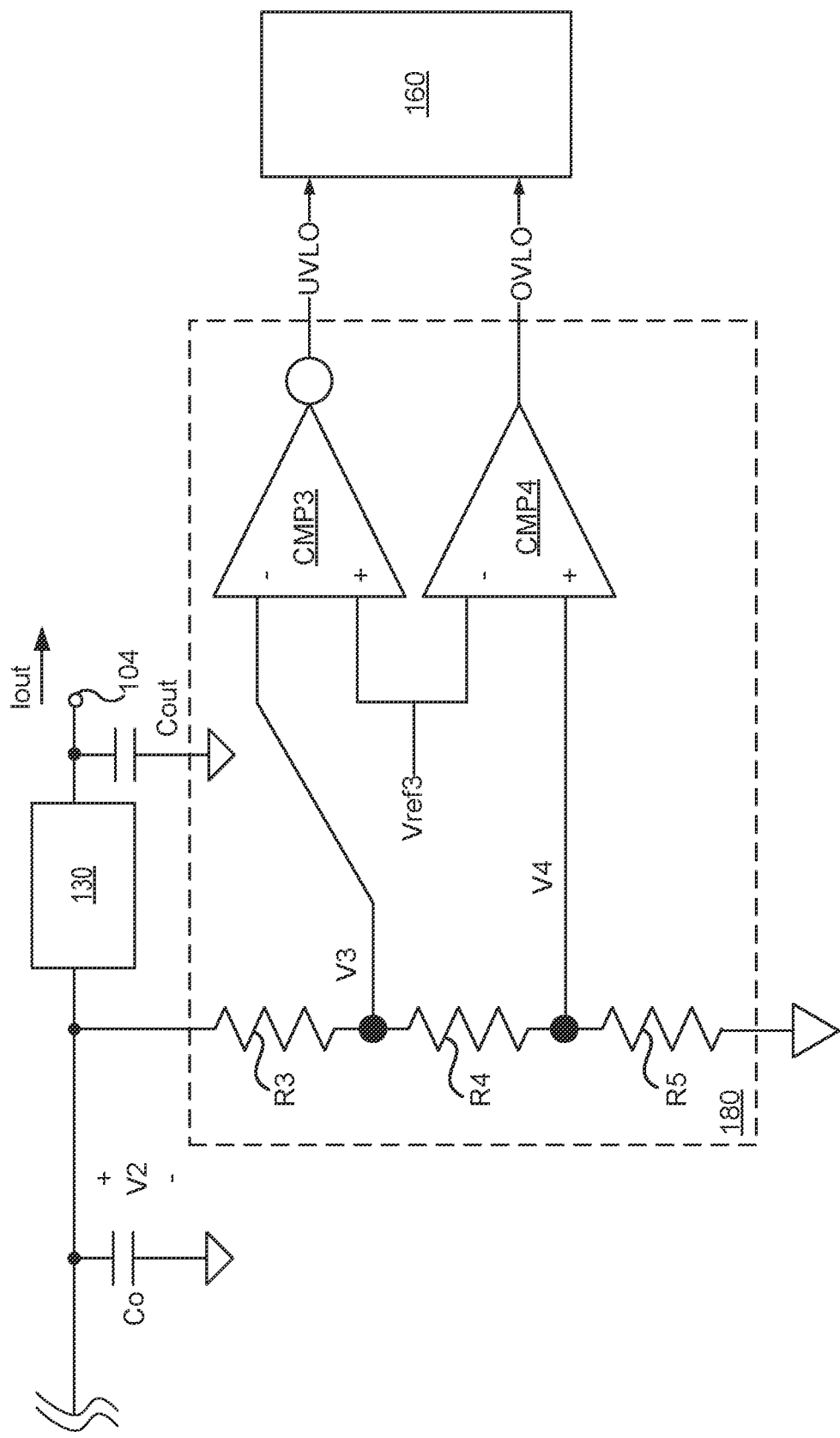
FIG. 11 is a circuit diagram illustrating another exemplary detecting circuit, in accordance with some embodiments of the present disclosure.

FIG. 11 is a circuit diagram illustrating another exemplary detecting circuit 180 applied to the detection of a fault condition on the output voltage V2, in accordance with some embodiments of the present disclosure. In some embodiments, a similar circuit can be used to monitor the input voltage V1. As shown in FIG. 11, the detecting circuit 180 includes resistors R3, R4, and R5, and comparators CMP3 and CMP4. The resistors R3, R4, and R5 may be electrically connected in series between V2 and the ground.

By properly selecting the value of the resistors R3, R4, and R5, the voltage V3 across the resistors R4 and R5, and the voltage V4 across the resistor R5, can be obtained. The voltages V3 and V4 may be both scaled down sampling signals of the output voltage V2. For example, the value of the resistors R3, R4, and R5 may be selected to ensure that the sampled voltage V3 is greater than a reference voltage Vref3 (e.g., around 1.2V), and the reference voltage Vref3 is greater than the sampled voltage V4 when the output voltage V2 is within the normal operating range.

A positive input terminal of the comparator CMP3 and a negative input terminal of the comparator CMP4 may be configured to receive the reference voltage Vref3, which is the threshold voltage for determining whether an over-voltage fault or an under-voltage fault occurs. A negative input terminal of the comparator CMP1 and a positive input terminal of the comparator CMP2 may be respectively coupled to two terminals of the resistor R4 and configured to receive voltages V3 and V4. Accordingly, when the output voltage V2 rises and exceeds a predetermined safety value, the rising sampled voltage V4 may exceed the reference voltage Vref3, and may trigger the output terminal of the comparator CMP4 to output an Over Voltage Lockout signal OVLO. Similarly, when the output voltage Vout drops under a predetermined safety value, the falling sampled voltage V3 may also drop to be lower than the reference voltage Vref3, and may trigger the output terminal of the comparator CMP3 to output an Under Voltage Lockout signal UVLO. Thus, the detecting circuit 180 in FIG. 11 may be configured to output the fault signals when a fault occurs on the output voltage V2.

It would be appreciated that, various types of detecting circuits or sensors may be applied for the fault detection, such as a temperature sensor for monitoring the temperature of the power converter. In some embodiments, the detecting circuits may further be configured to detect the fault level, or whether the fault is cleared, and output a corresponding signal to trigger different operations, such as limiting the fault condition while maintaining operation and regulation of the second terminal 104. In some other embodiments, the detecting circuits may output corresponding signal(s) to automatically disable the regulation of the second terminal 104 and latch-off, to perform auto restart/reset, etc. For example, these operations may be set in response to the fault conditions by one or more digital bits in the fault signals.

Figure 12:
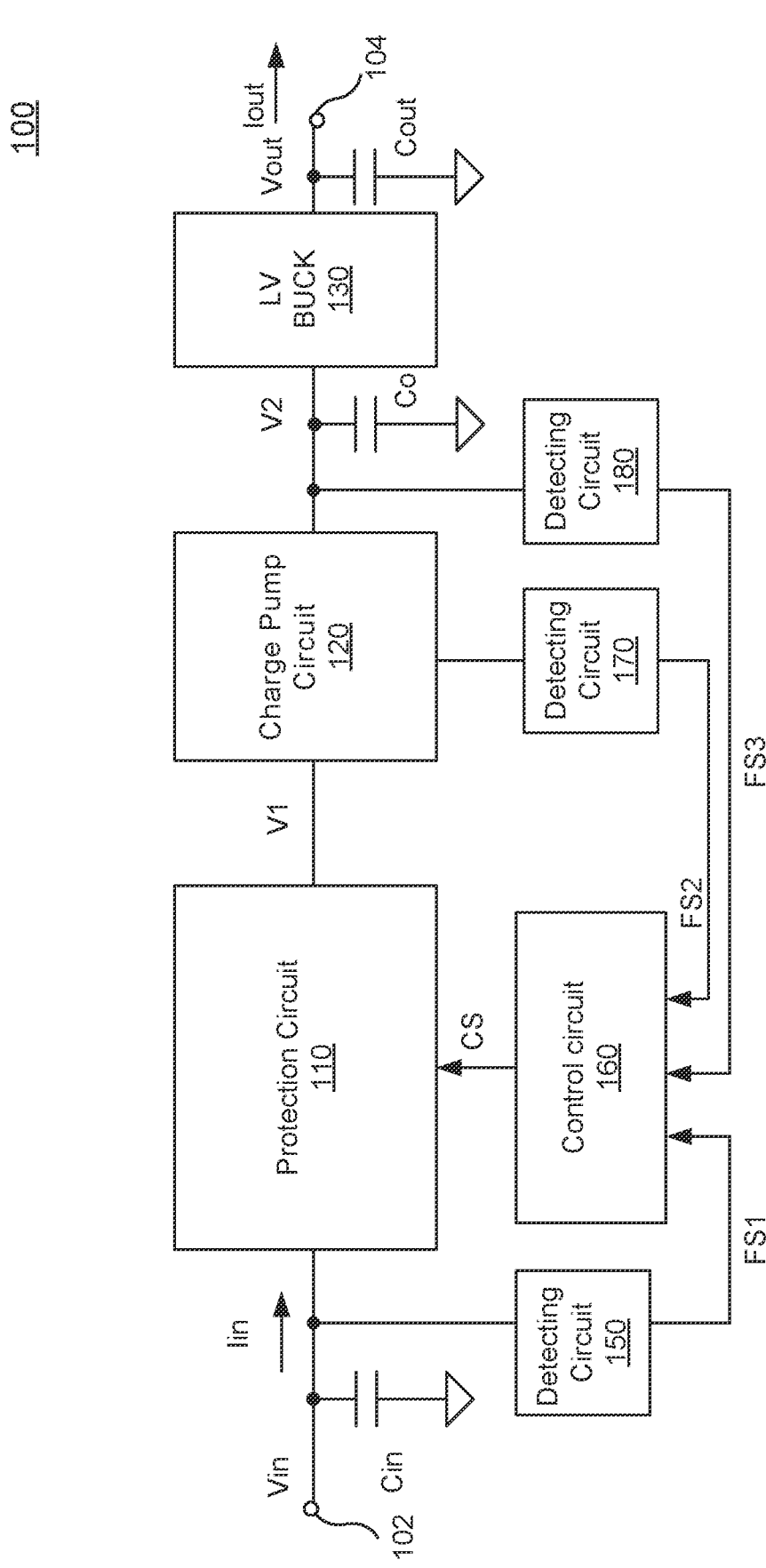
FIG. 12 is a block diagram illustrating yet another exemplary power converter, in accordance with some embodiments of the present disclosure.

FIG. 12 is a block diagram illustrating the power converter 100, in accordance with some embodiments of the present disclosure. As shown in FIG. 12, in some embodiments, each of the voltage, current, and/or other fault detecting circuits 150, 170, and 180 may be electrically connected to the control circuit 160, and electrically connected to a proper node within the power converter 100 to detect voltage signal(s), current signal(s) or other signals within the power converter 100. Accordingly, the voltage, current and/or other fault detecting circuits 150, 170, and 180 may be configured to output the fault signals FS1, FS2, FS3 to the control circuit 160 based on these signals.

For example, the voltage, current, and/or other fault detecting circuit 150 may be coupled between the control circuit 160 and the first terminal 102 and configured to detect whether the input current is in the proper range and whether the input voltage Vin across input capacitor Cin is within the proper range. The voltage, current, and/or other fault detecting circuit 170 may be coupled between the control circuit 160 and the input node of the charge pump circuit 120 and may be configured to detect whether the voltage V1 received by the charge pump circuit 120 is within the proper range. The voltage, current, and/or other fault detecting circuit 180 may be coupled between the control circuit 160 and the second terminal 104 and configured to detect whether the output voltage V2 across the capacitor Co and/or the output current is within the proper range. It would be appreciated that the arrangements of the voltage, current and/or other detecting circuits 150, 170, and 180 are merely examples and not meant to limit the present disclosure. As explained above, in various embodiments, the voltage, current and/or other detecting circuits 150, 170, and 180 may output the fault signals FS1, FS2, FS3 according to a detection of the input voltage, the output voltage, a charge pump capacitor voltage, an input current, an output current, a thermal value, a soft-start timeout, or any other suitable signals or events.

Accordingly, in response to the fault signal FS1, FS2, or FS3 outputted by any of the voltage, current, and/or other fault detecting circuits 150, 170, and 180, the control circuit 160 may output the control signal CS to control (e.g., turn off) the protection device within the protection circuit 110, either by blocking or restricting the current path and the power flow between the first terminal 102 and the charge pump circuit 120 in the downstream direction, or both upstream and downstream directions. For example, the voltage, current, or other fault detecting circuits 150, 170, and 180 may be used to determine whether the current flow or the voltage levels in the power converter 100 are within a safe range. When the current flow exceeds one or more safe levels in either the forward or the reverse direction, or the input or output voltage is out of a safe range (e.g., under voltage or over voltage), the bidirectional device may be controlled to restore current or voltage to safe levels or the bidirectional device may be turned off accordingly to protect the power converter 100. In addition, during a start-up or an initialization stage, the power converter 100 may also keep the protection device within the protection circuit 110 off, if an unsafe or undesired reverse power-flow would occur back to the first terminal 102. On the other hand, when the transient over-voltage occurs due to hot switching or hot-plug situations, the protection device within the protection circuit 110 can operate in the saturation region so the protection circuit 110 can withstand the excessive voltage and maintain normal operation of the power converter 100, without triggering the isolation.

Figure 13:
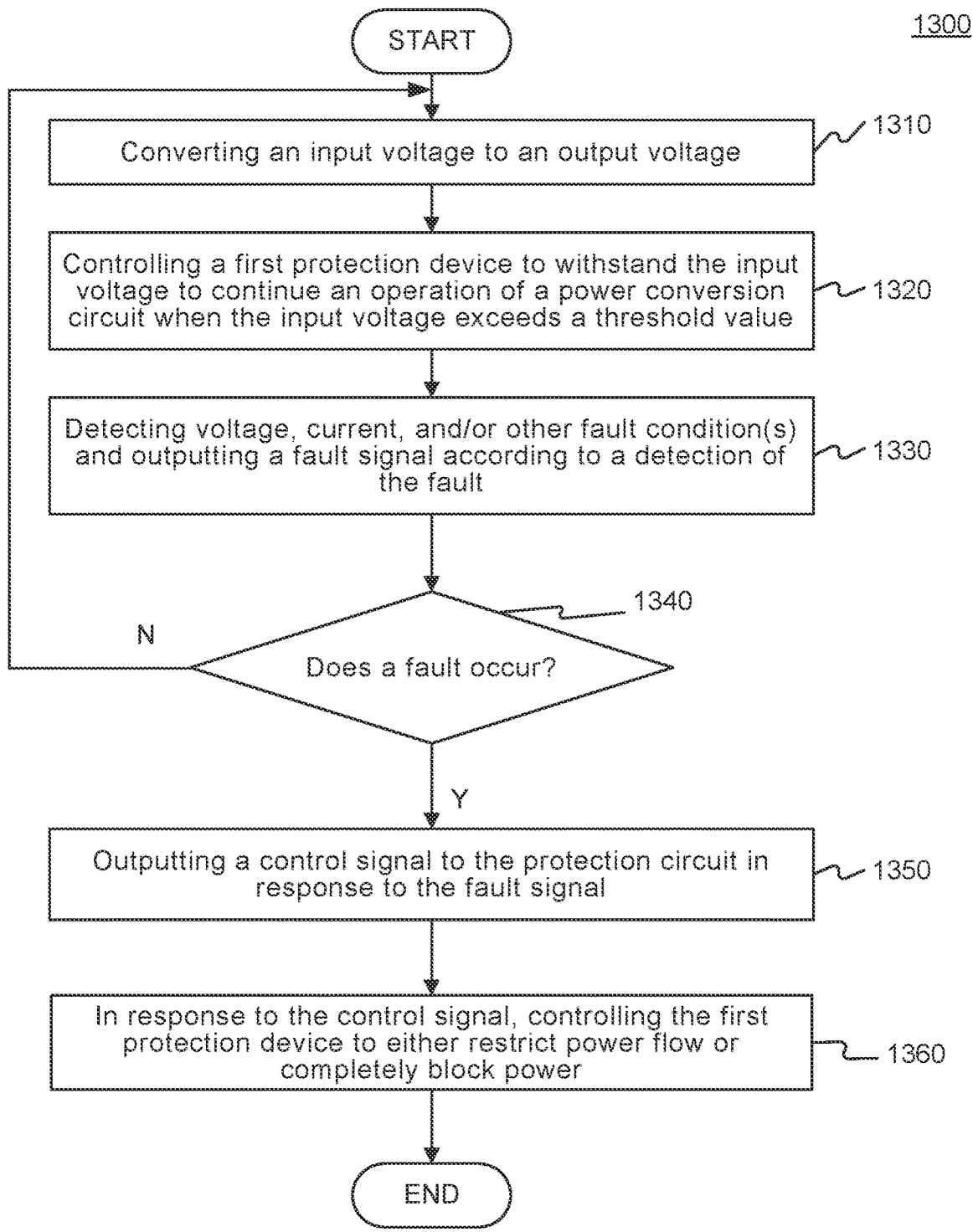
FIG. 13 is a flowchart of a method for protecting a power converter, in accordance with some embodiments of the present disclosure.

FIG. 13 is a flowchart of a method 1300 for protecting a power converter, in accordance with some embodiments of the present disclosure. It is understood that additional operations may be performed before, during, and/or after the method 1300 depicted in FIG. 13, and that some other processes may only be briefly described herein. The method 1300 can be performed by circuits and components in the power converter, e.g., the power converters 100, 200, 600, 700, and 800 illustrated in any of FIGS. 1-9, but the present disclosure is not limited thereto.

In operation 1310, method 1300 may convert a voltage. In some embodiments, operation 1310 may include a charge pump power converter (e.g., charge pump circuit 120 in FIG. 1) converting an input voltage V1 to an output voltage V2. In other embodiments, operation 1310 may include a charge pump power 120 followed by a buck converter 130 as in FIG. 1.

In operation 1320, method 1300 may control a first protection device to withstand the input voltage to continue the operation of the power conversion circuit (e.g., charge pump circuit 120 in FIG. 1) when the input voltage exceeds a threshold value. In some embodiments, operation 1320 may include a protection circuit (e.g., protection circuit 110 in FIG. 1) controlling a first protection device (e.g., the protection device 112) electrically coupled between the input terminal Vin of the power converter 100 and the charge pump circuit 120 to operate in a saturation region when the input voltage Vin exceeds a voltage threshold value. In some embodiments, the protection circuit may clamp a control voltage of the first protection device by a clamping circuit (e.g., Zener diode 114 in FIG. 1 or clamping circuit 210 in FIG. 2) that is electrically coupled to a control terminal of the first protection device.

In some embodiments, the method 1300 may further include operations 1330-1360 for various fault protections. In some embodiments, operation 1330 may include one or more detecting circuits (e.g., detection circuit 150, 170 or 180 in FIG. 10-FIG. 12) monitoring the operations of the power converter. The one or more detecting circuits (e.g., detecting circuits 150, 170, and 180 in FIG. 12) may detect voltage, current, and/or other fault condition(s) and output corresponding fault signals (e.g., fault signals FS1, FS2, FS3 in FIG. 12). For example, the detecting circuit 150 in FIG. 12 can detect voltage, current, and/or other fault condition on the input terminal of the power converter. The detecting circuit 170 in FIG. 12 can detect voltage, current, and/or other fault condition on an intermediate stage of the power converter. In some embodiments, the intermediate stage may include a power conversion circuit (e.g., charge pump circuit 120 in FIG. 12). The detecting circuit 180 in FIG. 12 can detect voltage, current, and/or other fault condition on the output terminal of the aforementioned intermediate stage (e.g., charge pump circuit 120 in FIG. 12). Accordingly, the fault signal can be generated according to the detection of the input voltage, the output voltage, the charge pump capacitor voltage, the input current, the output current, the thermal value, the soft-start timeout, transient events, or any combination thereof.

For example, the detecting circuit(s) may detect voltage signals, current signals, thermal values, soft-start timeout events, or transient events. In some embodiments, one or more controller(s) (e.g., microcontroller or processor) may receive information from one or more detecting circuits (e.g., detecting circuit 150, 170 or 180 in FIG. 10-FIG. 12) and include logic to evaluate whether the received data corresponds to a fault state. For example, a processor may include predefined values or combinations of values for voltage, current, and/or timeout data defining when a fault state occurs. The processor may compare the data to the predefined conditions to determine whether the data matches with that preprogrammed as a fault state. In other examples, the processor may compare the data obtained by the detecting circuit (e.g., detecting circuit 150, 170 or 180 in FIG. 10-FIG. 12) to given limits, and, when a certain number of limits are exceeded (e.g., voltage above 30 volts for a predefined period of time), the processor may determine that a fault condition has occurred. In some other embodiments, the fault detection and determination can be integrated with the detecting circuit(s), and implemented with analog, digital, or mixed analog and/or digital circuits and methods.

In operation 1340, the method 1300 may determine whether a fault has occurred based on the detection performed in operation 1330 and the corresponding fault signal(s). If no fault occurs (operation 1340—No), the method 1300 may proceed with the power converter repeating operations 1310-1340. When a fault is detected (operation 1340—Yes), the method 1300 may proceed to operation 1350.

In operation 1350, the method 1300 may include outputting a control signal. In some embodiments, operation 1350 may include a controller or a control circuit (e.g., control circuit 160 in FIG. 12) outputting a control signal to a protection circuit (e.g., protection circuit 110 in FIG. 12) in response to the fault signal received from the detecting circuit(s). For example, disclosed embodiments may receive the fault signal generated in operation 1330 and, based on the fault signal, may generate and send a control signal to appropriate protection circuitry.

In operation 1360, the protection circuit, electrically coupled to the power conversion circuit, either restricts or completely blocks the power flow from the input terminal to the output terminal, or restricts or completely blocks the power flow in both directions, in response to the control signal outputted by the controller or the control circuit.

For example, the method 1300 may include operations for over-current protection, but the present disclosure is not limited thereto. The detecting circuit (e.g., detecting circuit 150 in FIG. 12) may include a sensing circuit outputting a sensing current in response to an input current flowing through the first protection device. The control circuit may output a corresponding control signal to control the first protection device when the sensing current exceeds a current threshold value.

By the operations described above, the protection circuit can protect components in the power conversion circuit, and also protect downstream components in the next stage following the power converter. In some embodiments, the downstream circuits can thus be implemented without their own local over-stress protection mechanisms, which reduces the cost and the size of the downstream circuits. In addition, the power converter can avoid potential damages under fault conditions and maintain normal functions during the transient over-voltage condition, using the same protection device within the protection circuit.

Various embodiments described above can be implemented in various over-stress scenarios for different power system levels and for applications supporting different standards or regulations. For example, power converters and methods for protecting power converters can be applied in high-reliability applications, automotive applications, and/or military applications, and can be applied to address the hot-swap and hot-plug overstress issues in datacenter applications.

Disclosed methods and processes (e.g., method 1300) may be implemented in hardware, software instructions, or a combination of the two. In some embodiments, method 1300 may be implemented in fixed circuitry, such as with the circuitry discussed throughout this disclosure or other application-specific circuitry. In some embodiments, methods and process may be implemented through programmable instructions, such as volatile memory, nonvolatile memory, hard-coded media, and other mechanisms to store software instructions. In some embodiments, methods and process may be implemented in a combination of hardware and software. For example, fixed circuitry may be operated by a programmable controller. The controller may load instructions from on-board or off-board storage in order to control circuitry to collectively perform disclosed methods and process.

In the foregoing specification, embodiments have been described with reference to numerous specific details that can vary from implementation to implementation. Certain adaptations and modifications of the described embodiments can be made. It is also intended that the sequence of steps shown in figures is only for illustrative purposes and is not intended to be limited to any particular sequence of steps. As such, those skilled in the art can appreciate that these steps can be performed in a different order while implementing the same method.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not to be considered essential features of those embodiments unless the embodiment is inoperative without those elements.

The embodiments may further be described using the following clauses:

1. A power converter, comprising:
    a power conversion circuit electrically coupled between a first terminal and a second terminal, to convert a first voltage from the first terminal to a second voltage outputted at the second terminal; and
    a protection circuit electrically coupled between an input terminal of the power converter and the first terminal, the protection circuit comprising:
        a first protection device to withstand an input voltage of the power converter to continue an operation of the power conversion circuit when the input voltage exceeds a voltage threshold value; and
        a clamping circuit electrically coupled to a control terminal of the first protection device to clamp a control voltage of the first protection device.

2. The power converter of clause 1, wherein the clamping circuit comprises a Zener diode, or a combination of one or more diodes or transistors coupled to each other.

3. The power converter of clause 1, wherein the clamping circuit comprises:
    a voltage divider to output a sensing voltage in response to the control voltage of the first protection device;
    an error amplifier to compare the sensing voltage with a reference voltage; and
    a pull-down device electrically coupled between the control terminal of the first protection device and a ground terminal, wherein a control terminal of the pull-down device is electrically coupled to an output of the error amplifier.

4. The power converter of any of clauses 1-3, further comprising:
    a charge pump circuit electrically coupled to the first terminal, to maintain a constant voltage difference between an input and an output of the charge pump circuit.

5. The power converter of clause 4, further comprising:
    a first resistor electrically coupled between the output of the charge pump circuit and the control terminal of the first protection device.

6. The power converter of any of clauses 1-5, wherein the first protection device comprises a first power metal-oxide-semiconductor field-effect transistor (MOSFET) device and a second power MOSFET device having body diodes coupled in anti-series connection.

7. The power converter of clause any of clauses 1-6, further comprising:
    a second protection device electrically coupled between the input terminal and the first protection device, wherein a control terminal of the second protection device is electrically coupled to the control terminal of the first protection device.

8. The power converter of clause 7, further comprising:
    an initial charge resistor electrically coupled to the second protection device in parallel, to detect the input voltage during an initialization phase.

9. The power converter of clause any of clauses 1-6, further comprising:
    a second protection circuit, comprising:
        a current sensing circuit to output a sensing current in response to an input current flowing through the first protection device; and
        a control circuit electrically coupled to the current sensing circuit, to output a control signal to the protection circuit when the sensing current exceeds a current threshold value.

10. The power converter of any of clauses 1-9, further comprising:
    one or more detecting circuits to output a fault signal according to a detection of a parameter of the power converter; and
    a control circuit electrically coupled to the first protection device, to output a control signal to control the first protection device in response to the fault signal.

11. The power converter of clause 10, wherein the parameter of the power converter comprises at least one of the following: the input voltage, an output voltage, a charge pump capacitor voltage, an input current, an output current, a thermal value, or a soft-start timeout.

12. The power converter of clause 10 or clause 11, wherein the first protection device restricts or blocks a power flow in both directions between the input terminal of the power converter and an output terminal of the power converter.

13. The power converter of any of clauses 10-12, wherein the fault signal comprises an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.

14. The power converter of any of clauses 10-13, wherein the control circuit comprises:
    one or more control branches coupled in parallel, wherein any of the one or more control branches comprises a transistor device and a control resistor coupled in series between the control terminal of the first protection device and a ground terminal, and a control terminal of the transistor device receives a corresponding fault signal.

15. The power converter of any of clauses 1-14, further comprising:
    a buck converter electrically coupled between the second terminal and an output terminal of the power converter, to convert the second voltage to an output voltage.

16. The power converter of any of clauses 1-15, wherein the power conversion circuit comprises:
    a plurality of switches to switch between a first configuration and a second configuration; and
    a plurality of capacitors forming a first capacitor network in response to the first configuration of the plurality of switches, and forming a second capacitor network in response to the second configuration of the plurality of switches.

17. The power converter of any of clauses 1-16, further comprising:
    a second protection device electrically coupled between the input terminal and the first protection device, wherein a control terminal of the second protection device is electrically coupled to the control terminal of the first protection device;
    a current sensing device electrically coupled to the first protection device and the second protection device, wherein a control terminal of the current sensing device is electrically coupled to the control terminal of the first protection device, wherein the current sensing device outputs a sensing current in response to an input current flowing through the first protection device; and a control circuit electrically coupled to the current sensing device, to output a control signal to the protection circuit when the sensing current exceeds a current threshold value.

18. A method for protecting a power converter that receives a first voltage from a first terminal and provides a second voltage on a second terminal, comprising:
    converting, by a power conversion circuit, the first voltage to the second voltage;
    controlling a first protection device electrically coupled between an input terminal of the power converter and the power conversion circuit to withstand an input voltage of the power converter to continue an operation of the power conversion circuit when the input voltage exceeds a voltage threshold value; and
    clamping a control voltage of the first protection device by a clamping circuit electrically coupled to a control terminal of the first protection device.

19. The method of clause 18, further comprising:
    outputting, by a current sensing circuit, a sensing current in response to an input current flowing through the first protection device; and
    outputting a control signal to control the first protection device when the sensing current exceeds a current threshold value.

20. The method of clause 18 or clause 19, further comprising:
    controlling the first protection device in response to a control signal to restrict or block a power flow from the input terminal to an output terminal of the power converter.

21. The method of clause 20, further comprising:
    detecting, by one or more detecting circuits, one or more parameters of the power converter and outputting a fault signal when a fault occurs; and
    outputting, by a control circuit, the control signal to the first protection device in response to the fault signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power converter, comprising:
    a power conversion circuit, electrically coupled between a first terminal and a second terminal, to convert a first voltage from the first terminal to a second voltage outputted at the second terminal; and
    a protection circuit electrically coupled between an input terminal of the power converter and the first terminal, the protection circuit comprising:
        a first protection device to withstand an input voltage of the power converter to continue an operation of the power conversion circuit when the input voltage exceeds a voltage threshold value; and
        a clamping circuit electrically coupled to a control terminal of the first protection device to clamp a control voltage of the first protection device.

2. The power converter of claim 1, wherein the clamping circuit comprises a Zener diode, or a combination of one or more diodes or transistors coupled to each other.

3. The power converter of claim 1, wherein the clamping circuit comprises:
    a voltage divider to output a sensing voltage in response to the control voltage of the first protection device;
    an error amplifier to compare the sensing voltage with a reference voltage; and
    a pull-down device electrically coupled between the control terminal of the first protection device and a ground terminal, wherein a control terminal of the pull-down device is electrically coupled to an output of the error amplifier.

4. The power converter of claim 1, further comprising:
    a charge pump circuit, electrically coupled to the first terminal, to maintain a constant voltage difference between an input and an output of the charge pump circuit.

5. The power converter of claim 4, further comprising:
    a first resistor electrically coupled between the output of the charge pump circuit and the control terminal of the first protection device.

6. The power converter of claim 1, wherein the first protection device comprises a first power metal-oxide-semiconductor field-effect transistor (MOSFET) device and a second power MOSFET device having body diodes coupled in anti-series connection.

7. The power converter of claim 1, further comprising:
    a second protection device electrically coupled between the input terminal and the first protection device, wherein a control terminal of the second protection device is electrically coupled to the control terminal of the first protection device.

8. The power converter of claim 7, further comprising:
    an initial charge resistor, electrically coupled to the second protection device in parallel, to detect the input voltage during an initialization period.

9. The power converter of claim 1, further comprising:
    a second protection circuit, comprising:
        a current sensing circuit to output a sensing current in response to an input current flowing through the first protection device; and
        a control circuit, electrically coupled to the current sensing circuit, to output a control signal to the protection circuit when the sensing current exceeds a current threshold value.

10. The power converter of claim 1, further comprising:
    one or more detecting circuits to output a fault signal according to a detection of a parameter of the power converter; and
    a control circuit, electrically coupled to the first protection device, to output a control signal to control the first protection device in response to the fault signal.

11. The power converter of claim 10, wherein the parameter of the power converter comprises at least one of the following: the input voltage, an output voltage, a charge pump capacitor voltage, an input current, an output current, a thermal value, or a soft-start timeout.

12. The power converter of claim 10, wherein the first protection device restricts or blocks a power flow in both directions between the input terminal of the power converter and an output terminal of the power converter.

13. The power converter of claim 10, wherein the fault signal comprises an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.

14. The power converter of claim 10, wherein the control circuit comprises:
one or more control branches coupled in parallel, wherein any of the one or more control branches comprises a transistor device and a control resistor coupled in series between the control terminal of the first protection device and a ground terminal, and a control terminal of the transistor device receives a corresponding fault signal.

15. The power converter of claim 1, further comprising:
a buck converter, electrically coupled between the second terminal and an output terminal of the power converter, to convert the second voltage to an output voltage.

16. The power converter of claim 1, wherein the power conversion circuit comprises:
a plurality of switches to switch between a first configuration and a second configuration; and
a plurality of capacitors forming a first capacitor network in response to the first configuration of the plurality of switches, and forming a second capacitor network in response to the second configuration of the plurality of switches.

17. The power converter of claim 1, further comprising:
a second protection device electrically coupled between the input terminal and the first protection device, wherein a control terminal of the second protection device is electrically coupled to the control terminal of the first protection device;
a current sensing device electrically coupled to the first protection device and the second protection device, wherein a control terminal of the current sensing device is electrically coupled to the control terminal of the first protection device, wherein the current sensing device outputs a sensing current in response to an input current flowing through the first protection device; and
a control circuit, electrically coupled to the current sensing device, to output a control signal to the protection circuit when the sensing current exceeds a current threshold value.

18. A method for protecting a power converter that receives a first voltage from a first terminal and provides a second voltage on a second terminal, comprising:
converting, by a power conversion circuit, the first voltage to the second voltage;
controlling a first protection device electrically coupled between an input terminal of the power converter and the power conversion circuit to withstand an input voltage of the power converter to continue an operation of the power conversion circuit when the input voltage exceeds a voltage threshold value; and
clamping a control voltage of the first protection device by a clamping circuit electrically coupled to a control terminal of the first protection device.

19. The method of claim 18, further comprising:
outputting, by a current sensing circuit, a sensing current in response to an input current flowing through the first protection device; and
outputting a control signal to control the first protection device when the sensing current exceeds a current threshold value.

20. The method of claim 18, further comprising:
controlling the first protection device in response to a control signal to restrict or block a power flow from the input terminal to an output terminal of the power converter.

21. The method of claim 20, further comprising:
detecting, by one or more detecting circuits, one or more parameters of the power converter and outputting a fault signal when a fault occurs; and
outputting, by a control circuit, the control signal to the first protection device in response to the fault signal.

* * * * *